(12) United States Patent
Goto et al.

(10) Patent No.: US 9,182,530 B2
(45) Date of Patent: Nov. 10, 2015

(54) LIGHT GUIDE PLATE WITH TAPERING UNIT OPTICAL ELEMENTS

(75) Inventors: Masahiro Goto, Kashiwa (JP); Hiroshi Sekiguchi, Tokyo (JP); Hiroshi Yamamoto, Kawaguchi (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 100 days.

(21) Appl. No.: 13/697,615

(22) PCT Filed: Dec. 7, 2010

(86) PCT No.: PCT/JP2010/071907
§ 371 (c)(1),
(2), (4) Date: Nov. 13, 2012

(87) PCT Pub. No.: WO2011/151942
PCT Pub. Date: Dec. 8, 2011

(65) Prior Publication Data
US 2013/0057807 A1    Mar. 7, 2013

(30) Foreign Application Priority Data
May 31, 2010   (JP) .................................. 2010-124885

(51) Int. Cl.
*F21V 8/00*   (2006.01)
(52) U.S. Cl.
CPC ............ *G02B 6/0038* (2013.01); *G02B 6/0065* (2013.01); *G02B 6/0041* (2013.01); *G02B 6/0053* (2013.01)
(58) Field of Classification Search
CPC .. G02B 6/0038; G02B 6/0053; G02B 6/0065; G02B 6/0041

USPC .............................................. 362/620; 349/65
See application file for complete search history.

(56) References Cited

U.S. PATENT DOCUMENTS

| 7,384,173 B2 * | 6/2008 | Whitney ....................... 362/330 |
| 7,431,491 B2 * | 10/2008 | Liao ............................. 362/620 |
| 8,033,710 B2 | 10/2011 | Omori et al. |
| 8,075,174 B2 * | 12/2011 | Tsai et al. ..................... 362/620 |
| 2006/0007108 A1 | 1/2006 | Utsumi et al. |

(Continued)

FOREIGN PATENT DOCUMENTS

| CN | 101038392 A | 9/2007 |
| CN | 200976054 Y | 11/2007 |

(Continued)

OTHER PUBLICATIONS

Japanese Office Action (Application No. 2009-258086) dated Sep. 3, 2013.

(Continued)

*Primary Examiner* — Richard Kim
*Assistant Examiner* — Kendrick Hsu
(74) *Attorney, Agent, or Firm* — Burr & Brown, PLLC

(57) ABSTRACT

A light guide plate includes a body portion, first unit optical elements extending on the body portion in the light guide direction, and second unit optical elements disposed in between the first unit optical elements on the body portion. The width of each first unit optical element gradually decreases from that at the center to that at each end in the light guide direction. The ratio of the height to the width in each first unit optical element at the center is higher than the ratio of the height to the width in each second unit optical element.

19 Claims, 23 Drawing Sheets

(56) References Cited

U.S. PATENT DOCUMENTS

| | | |
|---|---|---|
| 2007/0223251 A1 | 9/2007 | Liao |
| 2009/0184906 A1* | 7/2009 | Park et al. ............... 345/84 |
| 2011/0128306 A1 | 6/2011 | Utsumi et al. |

FOREIGN PATENT DOCUMENTS

| | | |
|---|---|---|
| CN | 101178457 A | 5/2008 |
| CN | 201083845 Y | 7/2008 |
| CN | 101398149 A | 4/2009 |
| JP | 09-304625 A1 | 11/1997 |
| JP | 2003-141918 A1 | 5/2003 |
| JP | 2005-063912 A1 | 3/2005 |
| JP | 2005-085671 A1 | 3/2005 |
| JP | 2005-108512 A1 | 4/2005 |
| JP | 2006-039520 A1 | 2/2006 |
| JP | 2007-227405 A1 | 9/2007 |
| JP | 2007-273288 A1 | 10/2007 |
| JP | 2008-527409 A1 | 7/2008 |
| JP | 2009-175665 A1 | 8/2009 |
| WO | 2006/073644 A1 | 7/2006 |
| WO | 2007/108579 A1 | 9/2007 |

OTHER PUBLICATIONS

International Search Report dated Mar. 1, 2011.
Japanese Office Action (Application No. 2011-089181) dated Oct. 3, 2014.
Chinese Office Action (With English Translation), Chinese Application No. 201080067179.2, dated Jun. 26, 2014 (8 pages).

* cited by examiner

LIGHT GUIDE PLATE WITH TAPERING UNIT OPTICAL ELEMENTS

BACKGROUND OF THE INVENTION

1. Field of the Invention

The present invention relates to a light guide plate for guiding light, a surface light source device having the light guide plate, and a display device having the surface light source device.

2. Description of Related Art

Surface light source devices, which emit light from a planar surface, are widely used e.g. as a backlight which is incorporated in a liquid crystal display device and illuminates a liquid crystal display panel from the back (see e.g. JP 2007-227405A). Surface light source devices are roughly classified into direct-light type devices which have a light source disposed right behind an optical member, and edge-light type (also called side-light type) devices which have a light source disposed lateral to an optical member.

Edge-light type surface light source devices have a structural feature that enables design of thin surface light sources as compared to direct-light type surface light source devices. Because of the structural feature, edge-light type surface light source devices have heretofore been applied principally in display devices for laptop personal computers (PCs).

In an edge-light type surface light source device, a light guide plate is provided lateral to a light source, and light from the light source enters the light guide plate through the side surface (light entrance surface) of the light guide plate. The light that has entered the light guide plate repeats reflection at a pair of opposing main surfaces and travels in the light guide plate in a direction (light guide direction) almost perpendicular to the light entrance surface. The light traveling in the light guide plate is subject to the optical action of the light guide plate and is caused to gradually exit the light exit surface as it travels in the light guide plate. The amount of light, exiting the light exit surface of the light guide plate, can thus be prevented from varying greatly along the light guide direction. In an exemplary light guide plate, a light scattering component is dispersed in the light guide plate in order to change the direction of light traveling in the light guide plate, thereby allowing the light to exit the light guide plate gradually at various positions on the light guide plate along the light guide direction.

However, in current edge-light type surface light source devices, the amount of light exiting a light exit surface is not completely uniform along the light guide direction: the amount of the exiting light tends to be large locally in an area of the light exit surface, lying close to a light source. A viewer, viewing the display surface of a display device incorporating a surface light source device, can well perceive an increase in the brightness of an image as displayed in a central area of the display surface, corresponding to a central area of the light exit surface of the surface light source device, but cannot well perceive an increase in the brightness of an image as displayed in a peripheral area of the display surface, corresponding to a peripheral area of the light exit surface of the surface light source device.

Thus, the fact that the amount of exiting light is large locally in an area of a light exit surface, lying close to a light source, is undesirable not only from the viewpoint of ensuring the uniformity of the amount of exiting light along the light guide direction but also from the viewpoint of efficiently using a limited amount of light emitted by a light source. It would therefore be highly desirable if the amount of light exiting an area of a light exit surface, lying close to a light source, can be reduced while the amount of light exiting a central area of the light exit surface, lying remote from the light source, can be increased.

The present invention has been made in view of the above situation. It is therefore an object of the present invention to provide a display device, a surface light source device and a light guide plate which can effectively increase the brightness perceived by a viewer.

Nowadays, with the development of light sources that emit light with high linearity, as typified by a light emitting diode, edge-light type surface light source devices have been put into use also in display devices having a larger size than laptop PCs, for example home televisions. However, it has turned out that when a linear array of light emitting diodes (LEDs) is used as a light source, in-plane variation of brightness (more precisely luminance) is produced in an area of a display surface (light emitting surface), lying in the vicinity of a light entrance surface that faces the light source. More specifically, in the area of the display surface (light emitting surface), lying in the vicinity of the light entrance surface, a pattern of alternating bright and dark portions is formed along the LED arrangement direction at the same pitch as the pitch of the array of LEDs.

It has also turned out that the in-plane variation of brightness is marked when a light guide plate is used which has linear prisms extending in the light guide direction and provided on the light exit side. In particular, when a light guide plate with prisms is used, in-plane variation of brightness is observed in a larger area of a display surface (light emitting surface).

It is expected that as the emission intensity of LED increases in the future, a decreased number of LEDs will be arranged at a larger spacing in a light source in order to reduce the cost of a display device. It is, therefore, possible that the above-described in-plane variation of brightness may be observed more clearly in a wider area of a display surface (light emitting surface).

It would be highly desirable if the use of a light guide plate according to the present invention can obscure the in-plane variation of brightness in an area of a display surface (light emitting surface), lying in the vicinity of a light entrance surface, as observed when a light source is used which is comprised of a plurality of point-like light emitters arranged in a line.

SUMMARY OF THE INVENTION

The present invention provides a first light guide plate having a light exit surface, a back surface opposed to the light exit surface, at least one light entrance surface consisting of a part of a side surface between the light exit surface and the back surface, and a counter surface consisting of part of the side surface and opposing the one light entrance surface in a first direction, said light guide plate comprising:

a body portion; and first unit optical elements arranged on a one-side surface of the body portion in an arrangement direction intersecting the first direction, each element extending in a direction intersecting the arrangement direction, wherein when the light exit surface is viewed in a normal direction of an one-side surface of the body portion, the proportion of the area occupied by the first unit optical elements in the light exit surface is larger in a central area, containing a center between the light entrance surface and the counter surface on the one-side surface and extending between both ends of the one-side surface in a second direction perpendicular to the first direction, than in an end area containing a light entrance surface-side end of the one-side surface and extending between both ends of the one-side surface in the second direction.

The first light guide plate according to the present invention may further comprise second unit optical elements disposed between first unit optical elements on the one-side surface of the body portion. In such a first light guide plate according to the present invention, when the light exit surface is viewed in the normal direction of the one-side surface of the body portion, a proportion of an area occupied by the second unit optical elements in the light exit surface may be smaller in the central area than in the end area.

In the first light guide plate according to the present invention, the width of each first unit optical element in the arrangement direction increases with distance from the light entrance surface-side end in at least one section of the area from the light entrance surface-side end on the one-side surface to the center between the light entrance surface and the counter surface on the one-side surface.

The present invention provides a second light guide plate having a light exit surface, a back surface opposed to the light exit surface, at least one light entrance surface consisting of a part of the side surface between the light exit surface and the back surface, and a counter surface consisting of part of the side surface and opposing the one light entrance surface in a first direction, said light guide plate comprising:

a body portion; and first unit optical elements arranged on a one-side surface of the body portion in an arrangement direction intersecting the first direction, each element extending in a direction intersecting the arrangement direction, wherein a width of each first unit optical element in the arrangement direction increases with distance from a light entrance surface-side end in at least one section of the area from the light entrance surface-side end on the one-side surface to a center between the light entrance surface and the counter surface on the one-side surface.

The second light guide plate according to the present invention may further comprise second unit optical elements provided in between first unit optical elements on the one-side surface of the body portion.

In the second light guide plate according to the present invention, said at least one section may start at the light entrance surface-side end on the one-side surface.

In the first or second light guide plate according to the present invention, a ratio of a height of each first unit optical element to a width of the first unit optical element in the arrangement direction, at the center on the one-side surface, may be higher than a ratio of a height of each second unit optical element to a width of the second unit optical element in the arrangement direction at the light entrance surface-side end on the one-side surface.

In the first or second light guide plate according to the present invention, an angle of a light exit-side surface of each first unit optical element with respect to the one-side surface of the body portion at a base end of the light exit-side surface, the closest portion to the one-side surface of the body portion, in a cross-section parallel to both the normal direction of the one-side surface of the body portion and the arrangement direction of the first unit optical elements, and containing the center on the one-side surface, may be larger than an angle of a light exit-side surface of each second unit optical element with respect to the one-side surface of the body portion at a base end of the light exit-side surface, the closest portion to the one-side surface of the body portion, in a cross-section or end surface parallel to both the normal direction of the one-side surface of the body portion and the arrangement direction of the first unit optical elements, and containing the light entrance surface-side end on the one-side surface.

In the first or second light guide plate according to the present invention, a light exit surface angle of each first unit optical element, which is the angle of a light exit-side surface of the first unit optical element with respect to the one-side surface of the body portion in the main cross-section parallel to both the normal direction of the one-side surface of the body portion and the arrangement direction of the first unit optical elements, may change in at least one portion or region between an apex, the farthest point from the one-side surface of the body portion, and each base end, the closest portion to the one-side surface of the body portion, in the light exit-side surface of the second unit optical element such that the light exit surface angle solely increases from that at the apex to that at the base end.

In the first or second light guide plate according to the present invention, a light exit surface angle of each second unit optical element, which is the angle of a light exit-side surface of the second unit optical element with respect to the one-side surface of the body portion in the main cross-section parallel to both the normal direction of the one-side surface of the body portion and the arrangement direction of the first unit optical elements, may be constant between an apex, the farthest point from the one-side surface of the body portion, and each base end, the closest portion to the one-side surface of the body portion, in the light exit-side surface of the second unit optical element, or may change in at least one portion or region between the apex and the base end in the light exit-side surface of the second unit optical element such that the light exit surface angle solely increases from that at the apex to that at the base end.

In the first or second light guide plate according to the present invention, the first unit optical elements may each extend on the one-side surface of the body portion from the light entrance surface-side end to a counter surface-side end. In the light guide plate, a width of each first unit optical element in the arrangement direction at the center on the one-side surface may be larger than a width of the first unit optical element in the arrangement direction at the light entrance surface-side end on the one-side surface.

In the first or second light guide plate according to the present invention, the second unit optical elements may be disposed in an area containing the light entrance surface-side end on the one-side surface.

In the first or second light guide plate according to the present invention, the second unit optical elements may be arranged in the arrangement direction of the first unit optical element; and the first unit optical elements and the second unit optical elements may each extend linearly parallel to each other. In the light guide plate, an arrangement pitch of the first unit optical elements in the arrangement direction may be equal to an integral multiple of an arrangement pitch of at least two second unit optical elements disposed between two adjacent first unit optical elements. In such a light guide plate, a cross-sectional shape of each second unit optical element in a main cross-section parallel to both the normal direction of the one-side surface of the body portion and the arrangement direction of the first unit optical elements, may be constant along a longitudinal direction of the second unit optical element in that area of the second unit optical element which is not in contact with a first unit optical element on the one-side surface of the body portion.

In the first or second light guide plate according to the present invention, in a cross-sectional shape of each first unit optical element in a main cross-section parallel to both the normal direction of the one-side surface of the body portion and the arrangement direction of the first unit optical elements, and containing the center on the one-side surface, a shape of an area containing an apex, the farthest point from the one-side surface of the body portion, may be identical to the cross-sectional shape of each second unit optical element in the main cross-section parallel to both the normal direction of the one-side surface of the body portion and the arrangement direction of the first unit optical elements.

In the first or second light guide plate according to the present invention, the first unit optical elements may be arranged, with no space therebetween, in the arrangement direction at the center on the one-side surface.

In the first or second light guide plate according to the present invention, the second unit optical elements may be disposed at least in an end area containing the light entrance surface-side end on the one-side surface and extending between both ends of the one-side surface in the second direction perpendicular to the first direction.

In the first or second light guide plate according to the present invention, a cross-sectional shape of each first unit optical element in a cross-section parallel to both the normal direction of the one-side surface of the body portion and the arrangement direction of the first unit optical elements, and containing the center on the one-side surface, may be a pentagonal shape whose two sides lie between the apex, the farthest point from the one-side surface of the body portion, of the light exit-side surface and each base end, the closest portion to the one-side surface of the body portion, of the light exit-side surface, or a shape in which one or more of the corners of the polygonal shape are chamfered; and of the two sides lying between the apex and each base end of the light exit-side surface, the light exit surface angle of an apex-side side may be more than 10° and not more than 30°, and the light exit surface angle of a base end-side side may be more than 30° and not more than 60°.

In the first or second light guide plate according to the present invention, the body portion may comprise a resin matrix and a diffusing component dispersed in the matrix.

The present invention also provides a surface light source device comprising:

any one of the above-described first and second light guide plates according to the present invention; and a light source disposed so as to face the light entrance surface of the light guide plate.

In the surface light source device according to the present invention, the one light entrance surface of the light guide plate may serve as a first light entrance surface and the counter surface of the light guide plate may serve as a second light entrance surface; and the light source may include a first light source disposed so as to face the first light entrance surface, and a second light source disposed so as to face the second light entrance surface.

In the surface light source device according to the present invention, the light exit surface of the light guide plate may serve as a first light exit surface, and the back surface of the light guide plate may serve as a second light exit surface.

In the surface light source device according to the present invention, the light source may include point-like light emitters arranged so as to face the light entrance surface of the light guide plate.

The present invention also provides a display device comprising:

any one of the above-described surface light source devices according to the present invention; and a liquid crystal display panel disposed so as to face the surface light source device.

The display device according to the present invention may further comprise a control device; the light source may include point-like light emitters arranged so as to face the light entrance surface of the light guide plate; and the control device may be configured to control the output of each point-like light emitter, and adjust the output of each point-like light emitter according to an image to be displayed.

The light guide plate of the present invention can prevent a too large amount of light from exiting an area of the light exit surface, lying in the vicinity of a light source. This makes it possible to ensure a sufficient amount of light exiting a central area of the light exit surface of the light guide plate. Therefore, an image can be displayed brightly in the center of the display surface of a display device. It thus becomes possible to effectively increase the brightness of an image, perceived by a viewer.

DETAILED DESCRIPTION OF THE INVENTION

Figure 1:
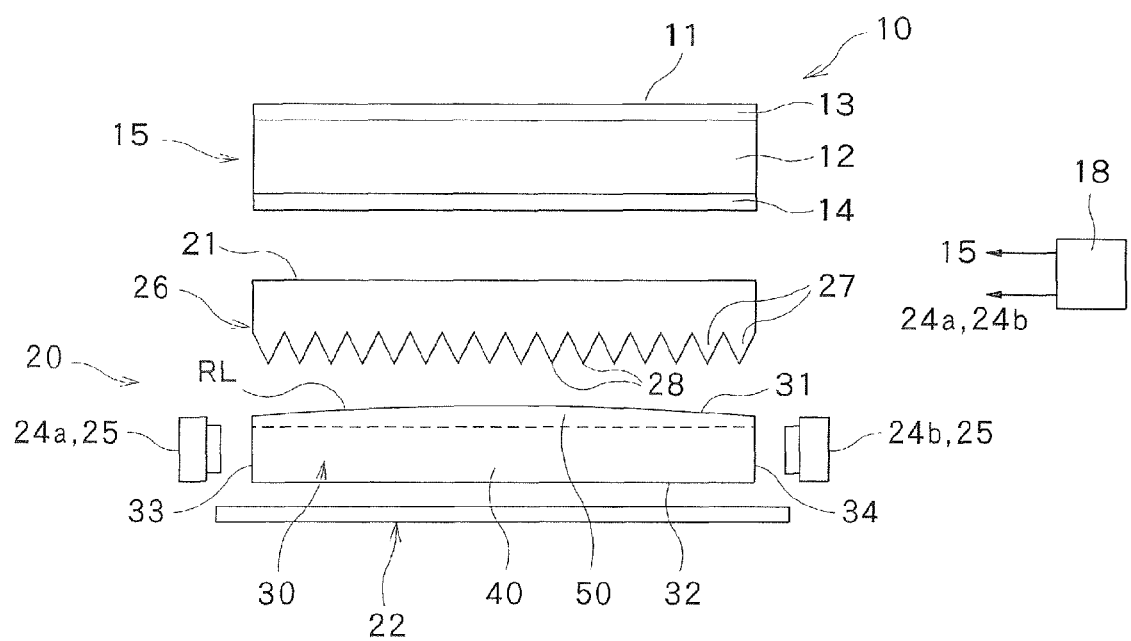
FIG. 1 is a diagram illustrating an embodiment of the present invention, being a cross-sectional view showing the schematic construction of a display device and a surface light source device.

Preferred embodiments of the present invention will now be described with reference to the drawings. In the drawings attached to the present specification, for the sake of illustration and easier understanding, scales, horizontal to vertical dimensional ratios, etc. are exaggeratingly modified from those of the real things.

Figure 2:
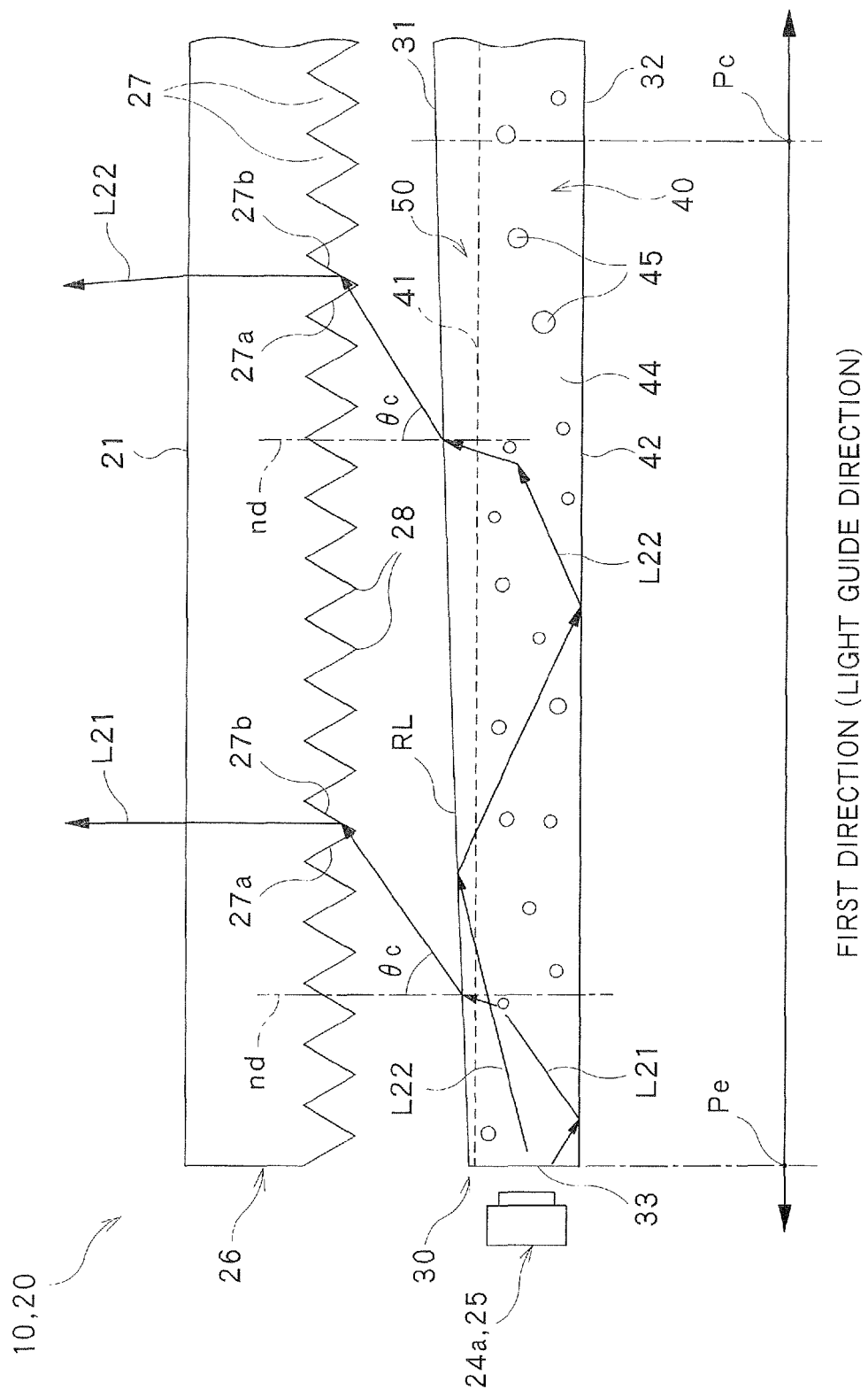
FIG. 2 is a diagram illustrating the action of the surface light source device of FIG. 1.
Figure 3:
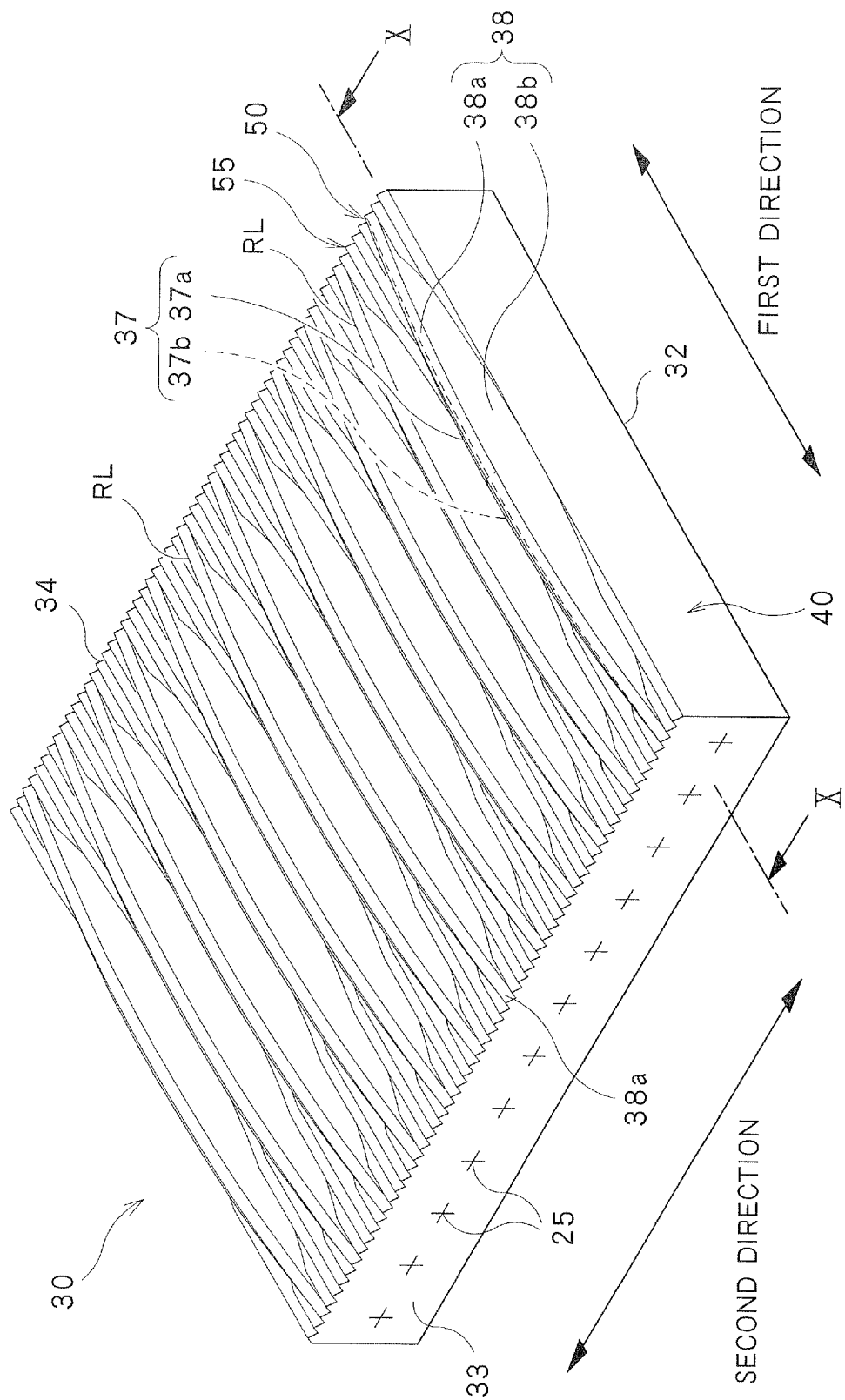
FIG. 3 is a perspective view of a light guide plate incorporated into the surface light source device of FIG. 1.
Figure 4:
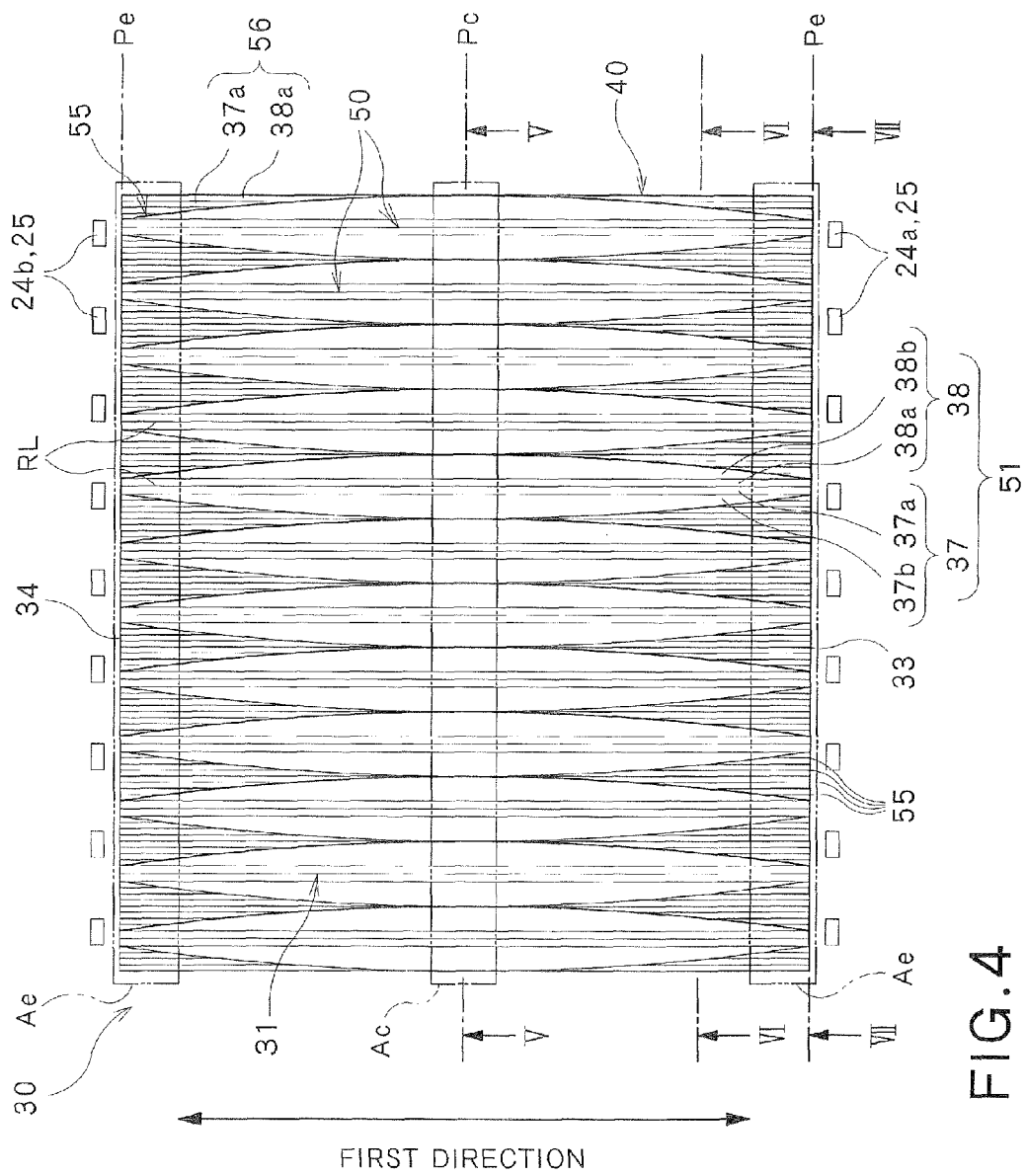
FIG. 4 is a plan view showing the light guide plate of FIG. 3, as viewed from the side of the light exit surface, together with a light source.
Figure 5:
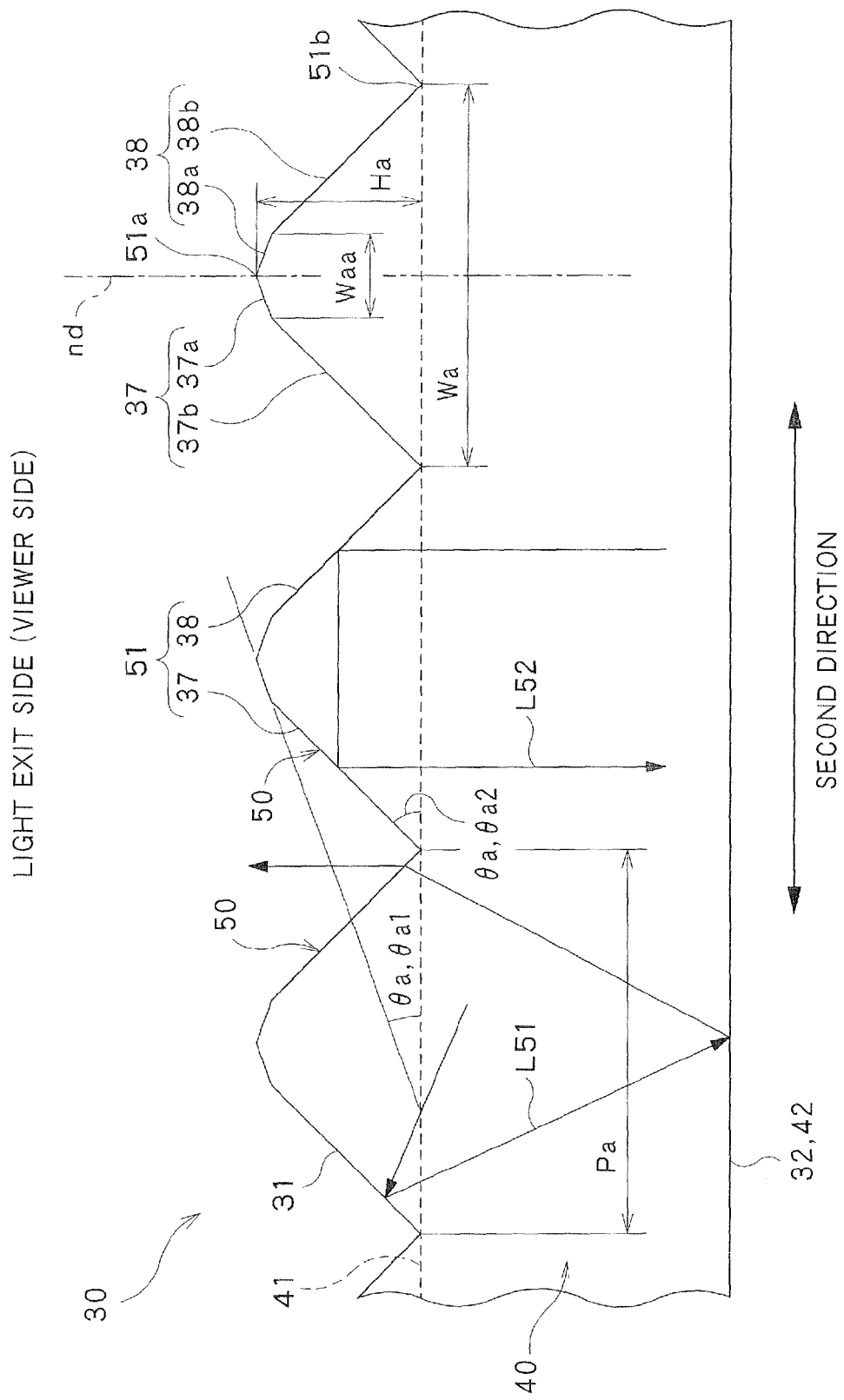
FIG. 5 is a diagram showing the light guide plate in the cross-section along the line V-V of FIG. 4.
Figure 6:
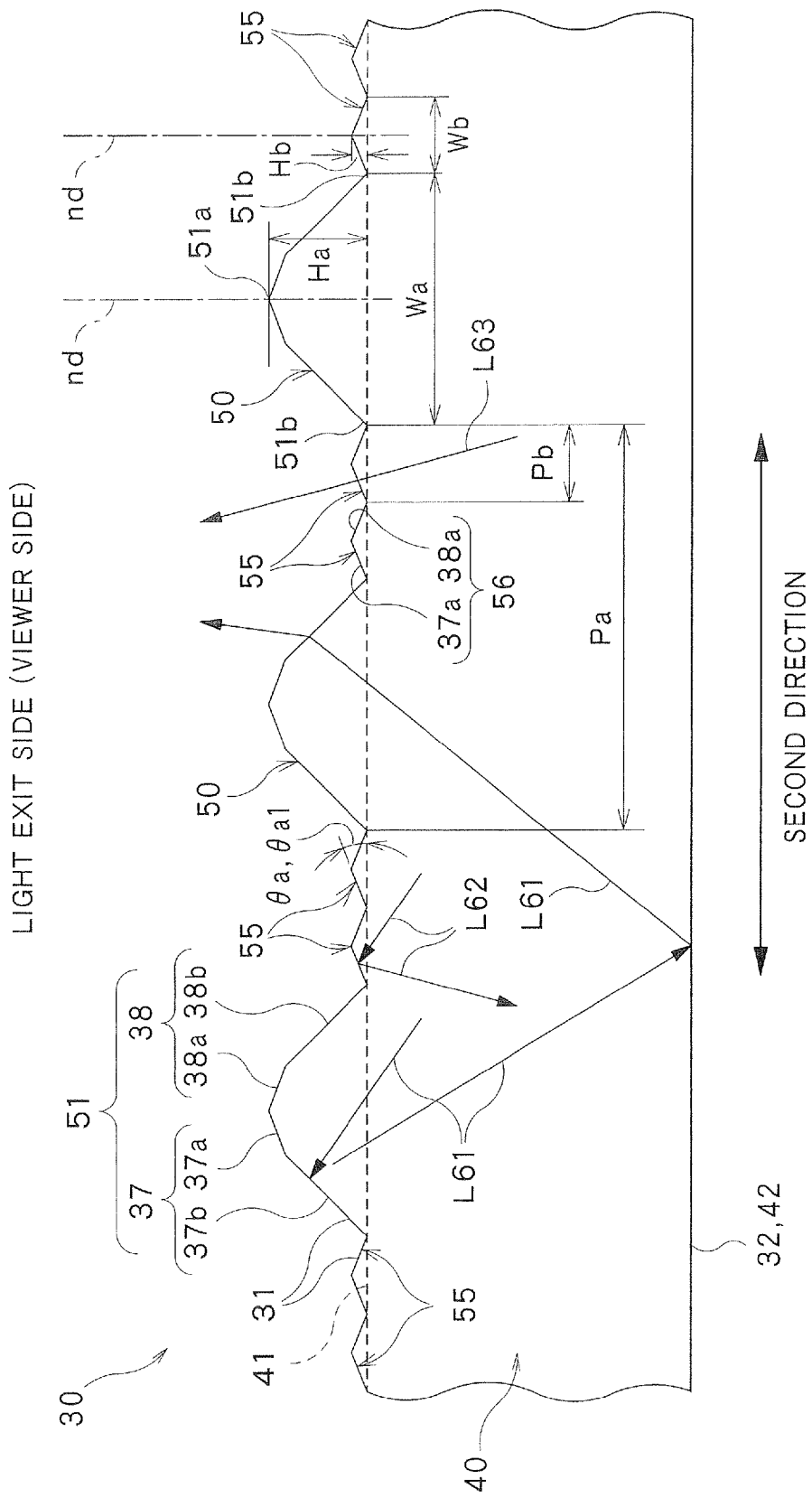
FIG. 6 is a diagram showing the light guide plate in the cross-section along the line VI-VI of FIG. 4.
Figure 7:
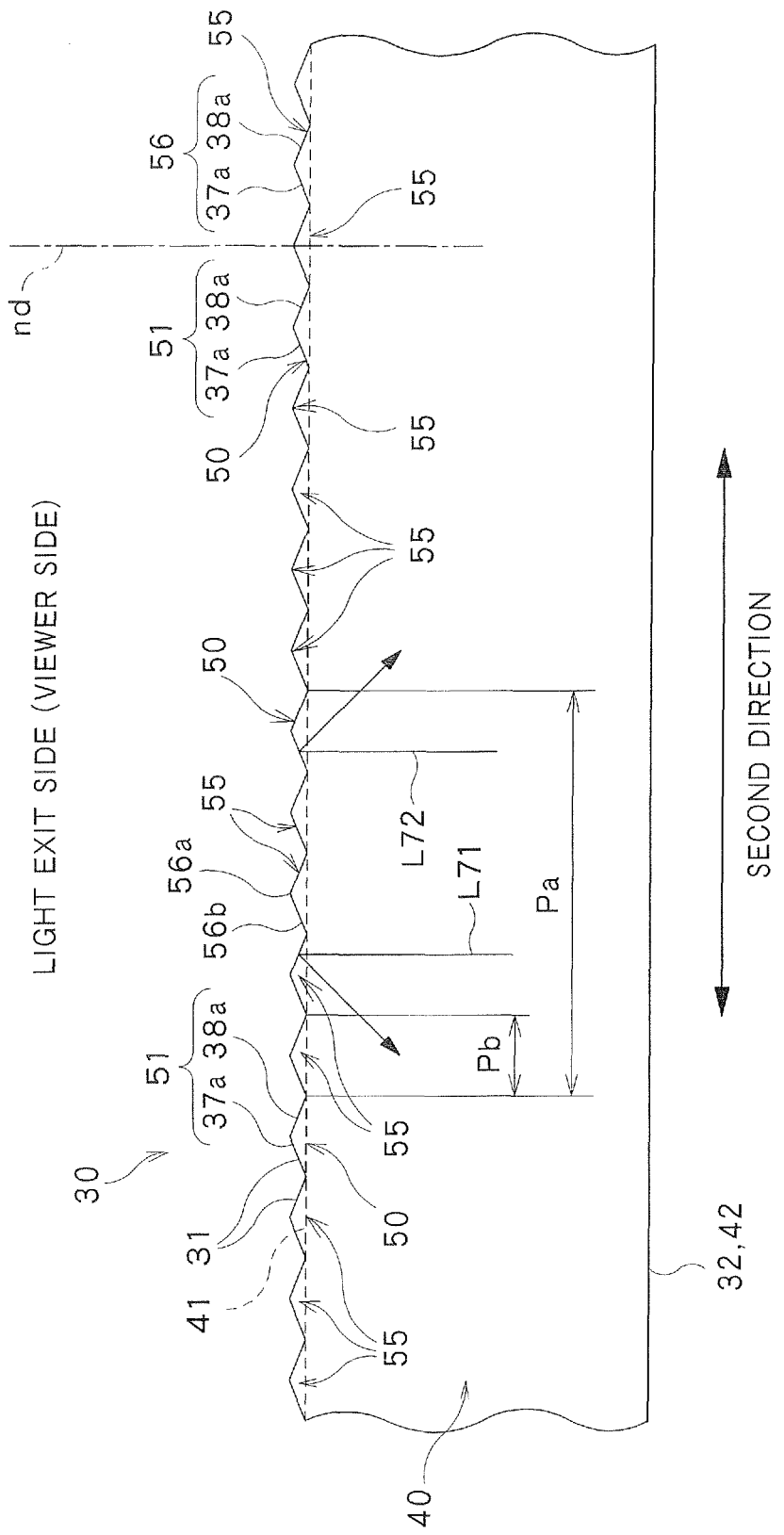
FIG. 7 is a diagram showing the light guide plate in the cross-section along the line VII-VII of FIG. 4.

FIGS. 1 through 17 are diagrams illustrating an embodiment of the present invention. Of these, FIG. 1 is a cross-sectional view showing the schematic construction of a display device and a surface light source device, and FIG. 2 is a cross-sectional view illustrating the action of the surface light source device. FIG. 3 is a perspective view showing a light guide plate incorporated into the surface light source device, FIG. 4 is a plan view showing the light guide plate as viewed from the side of the light exit surface, and FIGS. 5 through 7 are cross-sectional views each showing the light guide plate in the main cross-section. FIGS. 8 through 12 are diagrams illustrating the action of the light guide plate, and FIGS. 13(a) through 13(c) are diagrams illustrating the path of light from a light source in the vicinity of a light entrance surface of the light guide plate. FIGS. 14 through 17 are diagrams illustrating a method for producing the light guide plate. The light guide plate of FIGS. 1 and 2 is shown in the cross-section taken along the line X-X of FIG. 3.

As shown in FIG. 1, the display device 10 includes a liquid crystal display panel 15, a surface light source device 20, disposed behind the liquid crystal display panel 15, for illuminating the liquid crystal display panel 15 from the back, and a control device 18 for controlling the liquid crystal display panel 15 and the surface light source device 20. The display device 10 has a display surface 11.

The illustrated liquid crystal display panel 15 includes an upper polarizing plate 13 disposed on the light exit side, a lower polarizing plate 14 disposed on the light entrance side, and a liquid crystal cell 12 disposed between the upper polarizing plate 13 and the lower polarizing plate 14. The liquid crystal cell 12 is a member including a pair of support plates, e.g. made of glass, a liquid crystal disposed between the support plates, and an electrode for controlling the orientation of liquid crystal molecules by an electric field for each pixel region. The control device 18 is designed to control the orientation of liquid crystal molecules for each pixel. The liquid crystal display panel 15 thus functions as a shutter which controls transmission and blocking of light from the surface light source device 20 for each pixel, and can form an image through selective transmission of planar light from the surface light source device 20. The details of the liquid crystal display panel 15 are known from various documents (see e.g. "Dictionary of Flat Panel Display", edited by T. Uchida and H. Uchiike, 2001, Kogyo Chosakai Publishing Co., Ltd.), and hence a further detailed description thereof will be omitted.

The surface light source device 20 will now be described. The surface light source device 20 has a light emitting surface 21 which emits light over the area, and illuminates the liquid crystal display panel 15 from the back. As shown in FIG. 1, the surface light source device 20 is configured as an edge-light type surface light source device, and includes a light guide plate 30 and light sources 24a, 24b disposed lateral to the light guide plate 30. The light guide plate 30 has a light exit surface 31 which is the main surface on the side of the liquid crystal display panel 15, a back surface 32 which is the other main surface that opposes the light exit surface 31, and side surfaces extending between the light exit surface 31 and the back surface 32. Part of the side surfaces of the light guide plate 30 constitutes at least one light entrance surface and, in this embodiment, the light sources 24a, 24b are disposed opposite two light entrance surfaces. In particular, the side surfaces include one light entrance surface 33 and a counter surface 34 that opposes the one light entrance surface 34. Light that has entered the light guide plate 30 from the one light entrance surface 33 is guided in the light guide plate 30 generally along a first direction (light guide direction) connecting the one light entrance surface 33 and the counter surface 34 that opposes the one light guide surface 33. The surface light source device 20 further includes a reflective sheet 22 disposed opposite the back surface 32 of the light guide plate 30, and an optical sheet 26 disposed opposite the light exit surface 31 of the light guide plate 30.

In the illustrated embodiment, as with the display surface 11 of the liquid crystal display device 10 and the light emitting surface 21 of the surface light source device 20, the light exit surface 31 of the light guide plate 30 is formed in a square shape. Thus, the light guide plate 30 is a square plate-like member having a pair of the main surfaces (the light exit surface 31 and the back surface 32) and four side surfaces defined between the pair of the main surfaces. Of the side surfaces, the two side surfaces that oppose each other in the first direction are the light entrance surfaces 33, 34, as shown in FIG. 1. The one light entrance surface 33 serves as a first light entrance surface and the counter surface 34, opposing the first light entrance surface 33 in the first direction, serves as a second light entrance surface. As shown in FIG. 1, a first light source 24a is disposed opposite the first light entrance surface 33, and a second light source 24b is disposed opposite the second light entrance surface 34. The light guide plate 30 is constructed symmetrically with respect to a plane extending in a second direction perpendicular to the first direction connecting the two light entrance surfaces 33, 34 and containing a center position Pc between the two light entrance surfaces 33, 34 in the first direction.

Various types of light emitters, including a linear cold-cathode fluorescent lamp such as a fluorescent tube, point-like LEDs (light emitting diodes), an incandescent bulb, etc., can be used as the first light source 24a and the second light source 24b. In this embodiment the first light source 24a and the second light source 24b are each comprised of a large number of point-like light emitters 25, in particular light emitting diodes (LEDs), arranged side by side along the longitudinal direction of the corresponding light entrance surface 33 or 34. FIG. 3 shows the arrangement positions of the point-like light emitters 25 constituting the first light source 24a. The control device 18 can control the output of an individual point-like light emitter 25, i.e. turn-on and turn-off of an individual point-like light emitter 25 and/or the luminance of the light emitter 25, independently of the other point-like light emitters.

The reflective sheet 22 is a member which reflects light that has exited the back surface 32 of the light guide plate 30 so that the light will re-enter the light guide plate 30. The reflective sheet 22 may be comprised of a white scattering reflection sheet, a sheet composed of a material having high reflectance, such as a metal, a sheet having a surface film layer of a high-reflectance material (e.g. a metal film), or the like.

The optical sheet 26 is a sheet-like member for causing light, which has entered the light entrance side of the optical sheet 26, to exit the light exit side while changing the traveling direction of the light in such a manner as to selectively increase the front-direction luminance. In the embodiment illustrated in FIGS. 1 and 2, the optical sheet 26 has a plurality of unit prisms 27 arranged side by side on the sheet plane in one direction (arrangement direction), in particular in the first direction connecting the light entrance surface 33 (34) of the light guide plate 30 and the counter surface 34 (33) that opposes the light guide surface 33 (34). The unit prisms 27 each extend on the sheet plane of the optical sheet 30 in a straight line in a direction perpendicular to the arrangement direction. Each unit prism 27 has a triangular cross-sectional shape in a cross-section perpendicular to the longitudinal direction. The top (apex) 28 of the triangular cross-section of each unit prism 27 projects toward the light guide plate 30.

The terms "sheet", "film" and "plate" are not used herein to strictly distinguish them from one another. Thus, the term "sheet" includes a member which can also be called a film or plate.

The term "sheet plane (plate plane, film plane)" herein refers to a plane which coincides with the planar direction of an objective sheet-like member when taking a wide and global view of the sheet-like member. In this embodiment the plate plane of the light guide plate 30, the sheet plane of the optical sheet 26, the sheet plane of the reflective sheet 22, the panel plane of the liquid crystal display panel, the display surface 11 of the display device 10 and the light emitting surface 21 of the surface light source device 20 are parallel to each other. The term "front direction" herein refers to the normal direction nd (see e.g. FIG. 2 and FIGS. 5 through 7) of the light emitting surface 21 of the surface light source device 20, and in this embodiment coincides with the normal direction of the display surface 11 of the display device 10 and the normal direction of the plate plane of the light guide plate 30 and, when taking a wide and global view, also coincides with the normal direction of the light exit surface 31 of the light guide plate 30.

The terms "unit optical element", "prism" and "lens" herein refer to an element (optical element) which has a shape capable of exerting an optical action, such as refraction or reflection, on incident light, and are not used herein to strictly distinguish them from one another.

The light guide plate 30 will now be described in greater detail mainly with reference to FIGS. 2 through 4. As well shown in FIGS. 2 and 3, the light guide plate 30 comprises a plate-like body portion 40, and a plurality of first unit optical elements (unit shaped elements, unit prisms) 50 and a plurality of second unit optical elements (unit shaped elements, unit prisms) 55, both formed on the one-side surface (light exit-side surface) 41 of the body portion 40. The body portion 40 is a flat plate-like member having a pair of the parallel main surfaces. The other-side surface 42 of the body portion 40, which faces the reflective sheet 22, is the back surface 32 of the light guide plate 30.

As shown in FIG. 2, the body portion 40 comprises a resin matrix 44 and a diffusing component 45 dispersed in the matrix 44. The diffusing component 45 herein refers to a component which can exert an optical action, such as refraction or reflection, on light traveling in the body portion 40 to change the traveling direction of the light. Such a light diffusing effect (light scattering effect) of the light diffusing component 45 can be produced by using, as the light diffusing component 45, a material having a different refractive index from that of the matrix 44, or a material which can exert a reflective effect on light. The diffusing component 45 having a different refractive index from that of the matrix 44 may be exemplified by a metal compound or a porous material containing a gas, or air bubbles. In Figures other than FIG. 2, depiction of the diffusing component 45 is omitted.

The first unit optical elements 50 and the second unit optical elements 55, provided on the one-side surface 41 of the body portion 40, will now be described. The second unit optical elements 55 are provided in between the first optical elements on the one-side surface 41 of the body portion 40. Particularly in this embodiment, the second unit optical elements 55 are provided in the entire area of those portions of the one-side surface 41 of the body portion 40 in which no first unit optical element 50 exists. Thus, the light exit surface 31 of the light guide plate 30 consists solely of the light exit surfaces 51 of the first unit optical elements 50 and the light exit surfaces 56 of the second unit optical elements 55. A description of the first unit optical elements 50 will be given first, followed by a description of the second unit optical elements 55.

As well shown in FIGS. 3 and 4, the first unit optical elements 50 are arranged on the one-side surface 41 of the body portion 40 in an arrangement direction intersecting the first direction and parallel to the one-side surface 41 of the body portion 40. Each first unit optical element 50 extends linearly on the one-side surface 41 of the body portion 40 in a direction intersecting the arrangement direction.

Particularly in this embodiment, the first unit optical elements 50 are arranged side by side on the one-side surface 41 of the body portion 40 in the second direction (arrangement direction) perpendicular to the first direction. Further, as shown in FIGS. 5 through 7, in a cross-section parallel to both the normal direction nd of the one-side surface 41 of the body portion 40 (corresponding to the "front direction" in this embodiment) and the arrangement direction (corresponding to the "second direction" in this embodiment) of the first unit optical elements 50 (hereinafter referred to simply as "main cross-section"), each first unit optical element 50 has an apex 51a, the farthest point from the one-side surface 41 of the body portion 40. Thus, each first unit optical element 50 has a ridge line RL formed along the apices 51a. As well shown in FIG. 4, the first unit optical elements 50, when viewed in the front direction, are arranged on the one-side surface 41 such that the ridge lines RL are parallel to each other. In particular, as shown in FIG. 4, the ridge lines RL of the first unit optical elements 50 extend linearly in the first direction. In this embodiment the first unit optical elements 50 all have the same construction. Each first unit optical element 50 extends on the one-side surface 41 from a light entrance surface 33-side end position Pe to a counter surface 34-side end position Pe.

The width Wa of each first unit optical element 50 in the arrangement direction increases with distance from each light entrance surface-side end position Pe in at least one section of the area from the light entrance surface-side end position Pe on the one-side surface 41 to the center position Pc between the light entrance surface 33 and the counter surface 34 on the one-side surface 41. In this embodiment the width Wa of each first unit optical element 50 in the arrangement direction thus solely increases with distance from each light entrance surface-side end position Pe in the area from the end position Pe to the center position Pc.

Furthermore, in the embodiment shown in FIG. 4, the width Wa of each first unit optical element 50 in the arrangement direction continuously increases with distance from each light entrance surface-side end position Pe in the area from the end position Pe to the center position Pc. Though the width Wa of each first unit optical element 50 in the arrangement direction may increase at a constant rate with distance from each light entrance surface-side end position Pe, the rate of change (increase) is larger at a nearer position in each first unit optical element 50 to each light entrance surface-side end position Pe on the one-side surface 41 in the embodiment shown in FIGS. 3 and 4. Thus, when viewed from the front, each first unit optical element 50 has a curved contour.

Accordingly, the width Wa (see FIG. 5) of each first unit optical element 50 in the arrangement direction at the center position Pc on the one-side surface 41 of the body portion 40 is larger than the width Wa (see FIG. 7) of the first unit optical element 50 in the arrangement direction at the light entrance surface-side end position Pe on the one-side surface 41. Particularly in this embodiment, as shown in FIGS. 4 and 5, adjacent first unit optical elements 50 are in contact with each other at the center position Pc on the one-side surface 41 of the body portion 40. Thus, the first unit optical elements 50 are arranged in the arrangement direction with no space therebetween at the center position Pc on the one-side surface 41 of the body portion 40. No second unit optical element 55 therefore exists at the center position Pc on the one-side surface 41 of the body portion 40.

Because of the above-described change in the width Wa of each first unit optical element 50, when the light guide plate 30 is viewed from the side of the light exit surface 31 in the normal direction nd of the one-side surface 41 of the body portion 40, the proportion of the area occupied by the first unit optical elements 50 in the light exit surface 31 is larger in a central area Ac, containing the center position Pc on the one-side surface 41 and extending between both ends of the one-side surface 41 in the second direction perpendicular to the first direction, than in an end area Ae containing the light entrance surface-side end position Pe on the one-side surface 41 and extending between both ends of the one-side surface in the second direction. The second unit optical elements 55 are thus provided at least in the end area Ae containing the light entrance surface-side end position Pe on the one-side surface 41 and extending between both ends of the one-side surface 41 in the second direction perpendicular to the first direction.

A further description will be given of the cross-sectional shape of each first unit optical element 50 in the cross-section shown in FIGS. 5 through 7, i.e. in the main cross-section parallel to both the arrangement direction (second direction) of the first unit optical elements 50 and the normal direction nd of the one-side surface 41 of the body portion 40 (plate plane of the light guide plate 30). In the first unit optical elements 50 shown in FIG. 3, not only the width Wa of each first unit optical element 50 in the arrangement direction (second direction) changes along the first direction, but the height Ha of the first unit optical element 50 from the one-side surface 41 of the body portion 40 in the normal direction nd of the one-side surface 41 also changes along the first direction. Particularly in this embodiment, the height Ha of each first unit optical element 50 increases with increase in the width Wa and decrease with decrease in the width Wa.

Thus, the height Ha of each first unit optical element 50 in the front direction nd increases with distance from each light entrance surface-side end position Pe in at least one section of the area from the light entrance surface-side end position Pe on the one-side surface 41 to the center position Pc between the light entrance surface 33 and the counter surface 34 on the one-side surface 41. In this embodiment the height Ha of each first unit optical element 50 in the front direction nd thus solely increases with distance from each light entrance surface-side end position Pe in the area from the end position Pe to the center position Pc.

Furthermore, as shown in FIGS. 5 through 7, in this embodiment the height Ha of each first unit optical element 50 in the front direction nd continuously increases with distance from each light entrance surface-side end position Pe in the area from the end position Pe to the center position Pc. In the embodiment shown in FIGS. 3 and 4, the rate of change (increase) in the height Ha of each first unit optical element 50 in the front direction nd is larger at a nearer position in each first unit optical element 50 to each light entrance surface-side end position Pe on the one-side surface 41. Thus, when viewed from the side (in the second direction), the ridge line RL of each first unit optical element 50 has a curved contour as shown in FIG. 2. Accordingly, in this embodiment the height Ha (see FIG. 5) of each first unit optical element 50 in the front direction nd at the center position Pc on the one-side surface 41 of the body portion 40 is larger than the height Ha (see FIG. 7) of the first unit optical element 50 in the front direction nd at the light entrance surface-side end position Pe on the one-side surface 41.

The cross-sectional shape of each first unit optical element 50 in the main cross-section thus changes in the width Wa and the height Ha along the first direction in the area from each light entrance surface-side end position Pe to the center position Pc on the one-side surface 41, as shown in FIGS. 5 through 7. In this embodiment, as shown in FIGS. 5 through 7, in the cross-sectional shape of each first unit optical element 50 in the main cross-section, the shape of an area containing the apex 51a, the farthest point from the one-side surface 41 of the body portion 40, is the same regardless of the position of the cross-section in the first direction. In particular, in the area from each light entrance surface-side end position Pe to the center position Pc on the one-side surface 41 of the body portion 40, the cross-sectional shape of each first unit optical element 50 in the main cross-section at a particular position in the first direction includes the cross-sectional shape of the first unit optical element 50 in the main cross-section at a position in the first direction closer to the light entrance surface-side end position Pe than the particular position. In other words, the cross-sectional shape of each first unit optical element 50 in the main cross-section changes such that as the position of the main cross-section moves in the first direction from each light entrance surface-side end position Pe toward the center position Pc, a new portion, lying adjacent to the one-side surface 41 of the body portion 40, is gradually added to the base end of the cross-sectional shape.

In the main cross-section of each first unit optical element 50 whose cross-sectional shape thus changes along the first direction, it is preferred that the ratio (Ha/Wa) of the height Ha in the front direction to the width Wa in the arrangement direction (second direction) be relatively high in the central area Ac containing the center position Pc on the one-side surface 41 and extending in the second direction. More specifically, in the main cross-section of each first unit optical element 50 at the center position Pc, the ratio (Ha/Wa) of the height Ha in the front direction to the width Wa in the arrangement direction (second direction) is preferably not less than 0.25 and not more than 0.6. It has been found in the present inventors' studies that such first unit optical elements can exert excellent light condensing effect and light extracting effect in the central area Ac, corresponding to a central area of the display surface 11 where brightness is best perceived by a viewer, thereby effectively increasing the brightness as will be described in more detail later.

On the other hand, it is preferred that the ratio (Ha/Wa) of the height Ha in the front direction to the width Wa in the arrangement direction (second direction) be relatively low in each end area Ae containing the light entrance surface-side end position Pe on the one-side surface 41 and extending in the second direction. More specifically, the ratio (Ha/Wa) of the height Ha to the width Wa in each first unit optical element 50 in the main cross-section in each end area Ae, e.g. in the main cross-section (end surface) at the end position Pe, is preferably lower than the ratio (Ha/Wa) of the height Ha to the width Wa in the main cross-section in the central area Ac, e.g. in the main cross-section at the center position Pc. Such first unit optical elements 50 can prevent too high brightness in each end area Ae, corresponding to an end area of the display surface 11 where brightness is less perceived by a viewer, as will be described in more detail later.

It has also been found by the present inventors that in the main cross-section of each first unit optical element 50 in each end area Ae, e.g. in the main cross-section (end surface) at the end position Pe, the ratio (Ha/Wa) of the height Ha in the front direction to the width Wa in the arrangement direction (second direction) preferably takes a low value more than 0, in particular not less than 0.05 and not more than 0.3. Such first unit optical elements 50 can effectively prevent variation in brightness from being produced in those areas of the light exit surface 31 of the light guide plate 30 which lie in the vicinity of the light entrance surfaces 33, 34 that face the light sources 24a, 24b, as will be described in more detail later.

It is preferred that the light exit surface angle θa of each first unit optical element 50, which is the angle of the light exit-side surface 51 with respect to the one-side surface 41 of the body portion 40 in the main-cross section, be relatively large in the central area Ac containing the center position Pc on the one-side surface 41 of the body portion 40 and extending in the second direction. More specifically, a region Waa (see FIG. 5) of the contour 51, where the light exit surface angle θa is more than 30° and not more than 60°, preferably has a width corresponding to not less than 70% and not more than 100% of the full width Wa of the first unit optical element 50 in the arrangement direction of the first unit optical elements 50 (the second direction in this embodiment). Thus, the region Waa having a light exit surface angle θa of more than 30° and not more than 60°, when projected in the front direction nd, preferably accounts for not less than 70% and not more than 100% of the full width Wa of the first unit optical element 50. It has been found in the present inventors' studies that when in a front view (when the light exit surface 31 of the light guide plate 30 is viewed in the front direction) the area in which the light exit surface angle θa of the first unit optical element 50 is more than 30° and not more than 60° accounts for not less than 70% and not more than 100% of the entire area of the light exit-side surface (contour) 51 of the first unit optical element 50, the first unit optical elements 50 can exert excellent light condensing effect on a light component along the arrangement direction (second direction) of the first unit optical elements 50, as will be described in more detail later.

On the other hand, it is preferred that the light exit surface angle θa be relatively small in each end area Ae containing the light entrance surface-side end position Pe on the one-side surface 41 and extending in the second direction. More specifically, the light exit surface angle θa of each first unit optical element 50 (especially at the base end 51b) in the main cross-section in each end area Ae, e.g. in the main cross-section (end surface) at the end position Pe, is preferably smaller than the light exit surface angle θa of the first unit optical element 50 (especially at the base end 51b) in the main cross-section in the central area Ac, e.g. in the main cross-section at the center position Pc. Such first unit optical elements 50 can prevent too high brightness in each end area Ae, corresponding to an end area of the display surface 11 where brightness is less perceived by a viewer, as will be described in more detail later.

It has also been found by the present inventors that in the main cross-section in each end area Ae, e.g. in the main cross-section (end surface) at the end position Pe, the light exit surface angle θa of each first unit optical element 50 preferably takes a low value more than 0, in particular more than 10° and not more than 30°. Such first unit optical elements 50 can effectively prevent variation in brightness from being produced in those areas of the light exit surface 31 of the light guide plate 30 which lie in the vicinity of the light entrance surfaces 33, 34 that face the light sources 24a, 24b, as will be described in more detail later.

As described above, the light exit surface angle θa refers to the angle of the light exit-side surface (contour) 51 of each first unit optical element 50 with respect to the one-side surface 41 of the body portion 40 in the main cross-section of the light guide plate 30. When the contour (light exit-side surface) 51 of each first unit optical element 50 in the main cross-section has the shape of a polygonal line as in the embodiment illustrated in FIGS. 5 through 7, the light exit surface angle θa refers to the angle formed between a straight line segment of the polygonal line and the one-side surface 41 of the body portion 40 (more precisely the smaller one (minor angle) of the two angles formed). On the other hand, the contour (light exit-side surface) 51 of each first unit optical element 50 in the main cross-section may have a curved shape, as in the below-described variations. In such a case, the light exit surface angle θa refers to the angle formed between a tangent line TL to the curved contour 51 of a first unit optical element 50 and the one-side surface 41 of the body portion 40 (more precisely the smaller one (minor angle) of the two angles formed). The light exit surface angle ea of the below-described second unit optical element 55 has the same definition as the light exit surface angle θa of the first unit optical element 50.

In this embodiment the light exit surface angle θa of each first unit optical element 50 changes in at least one portion or region in the light exit-side surface 51 of the first unit optical element 50 between the apex 51a, the farthest point from the one-side surface 41 of the body portion 40, and the base end 51b, the closest portion to the one-side surface 41 of the body portion 40. Particularly in this embodiment, the light exit surface angle θa solely increases, i.e. never decreases, from that at the apex 51a to that at the base end 51b.

As described above, in this embodiment, in the area from each light entrance surface-side end position Pe to the center position Pc on the one-side surface 41 of the body portion 40, the cross-sectional shape of each first unit optical element 50 in the main cross-section at a particular position in the first direction includes the cross-sectional shape of the first unit optical element 50 in the main cross-section at a position in the first direction closer to the light entrance surface-side end position Pe than the particular position. In other words, the cross-sectional shape of each first unit optical element 50 in the main cross-section changes such that as the position of the main cross-section moves in the first direction from each light entrance surface-side end position Pe toward the center position Pc, a new portion, lying adjacent to the one-side surface 41 of the body portion 40, is gradually added to the base end of the cross-sectional shape. The first unit optical elements 50 having such a construction can be designed in such a way that the light exit surface angle θa at the base end 51b of the light exit-side surface 51 of each first unit optical element 50 gradually increases as the position of the main cross-section moves in the first direction from each light entrance surface-side end position Pe toward the center position Pc. Similarly, the first unit optical elements 50 can be designed in such a way that the above-described ratio (Ha/Wa) of the height Ha to the width Wa in each first unit optical element 50 gradually increases as the position of the main cross-section moves in the first direction from each light entrance surface-side end position Pe toward the center position Pc.

Such first unit optical elements 50 can exert excellent light condensing effect and light extracting effect in the central area Ac and can thereby effectively increase the brightness in the central area Ac while preventing too high brightness in each end area Ae where brightness is less perceived by a viewer. In addition, such first unit optical elements 50 can effectively prevent variation in brightness from being produced in those areas of the light exit surface 31 of the light guide plate 30 which lie in the vicinity of the light entrance surfaces 33, 34 that face the light sources 24a, 24b.

The exemplary first unit optical elements 50 shown in FIGS. 3 through 7 each have, in the main cross-section of the light guide plate 30 but excluding the main cross-section (see FIG. 7) at each end position Pe in the first direction, a pentagonal shape whose one side lies on the one-side surface 41 of the body portion 40 and whose two sides lie between the apex 51a and each end 51b of the contour 51, or a shape in which one or more of the corners of the polygonal shape are chamfered. In the illustrated embodiment, in order to effectively increase the front-direction luminance and to impart symmetry to the angular distribution of luminance in a plane along the second direction, the cross-sectional shape of each first unit optical element 50 in the main cross-section is made symmetrical with respect to the front direction nd.

In particular, as shown in FIGS. 5 and 6, the light exit-side surface 51 of each first unit optical element 50 is composed of a pair of bent surfaces 37, 38 which are symmetrical with respect to the front direction. The bent surfaces 37, 38 are connected to each other, and the connection defines the apex 51a (ridge line RL). The pair of bent surfaces 37, 38 consists of a pair of gently inclined surfaces (first inclined surfaces) 37a, 38a disposed on both sides of the apex 51a, and a pair of steeply inclined surfaces (second inclined surfaces) 37b, 38b extending from the body portion 40 and connecting to the gently inclined surfaces 37a, 38a, respectively. The gently inclined surfaces 37a, 38a connect to each other, and the connection defines the ridge line RL (apex 51a). The gently inclined surfaces 37a, 38a are symmetrical with respect to the front direction nd, and the steeply inclined surfaces 37b, 38b are also symmetrical with respect to the front direction nd.

On the other hand, as shown in FIG. 7, each first unit optical element 50 is solely defined by the gently inclined surfaces (first inclined surfaces) 37a, 38a, and thus does not have the steeply inclined surfaces (second inclined surfaces) 37b, 38b at the light entrance surface-side ends on the one-side surface 41 of the body portion 40. Thus, the end surface of each first unit optical element 50 has a triangular shape, whose corner(s) may be chamfered, defined by the gently inclined surfaces (first inclined surfaces) 37a, 38a and the one-side surface 41 of the body portion 40.

In the first unit optical elements 50 shown in FIGS. 5 and 6, the light exit surface angle θa1 of the gently inclined surfaces 37a, 38a is more than 10° and not more than 30°, while the light exit surface angle θa2 of the steeply inclined surfaces 37b, 38b is more than 30° and not more than 60°, which can exert excellent light condensing effect and light extracting effect. The ratio (Ha/Wa) of the height Ha to the width Wa in each first unit optical element 50 is not less than 0.25 and not more than 0.6 in the main cross-section at the center position Pc and not less than 0.05 and not more than 0.3 in the main cross-section (end surface) at the end position Pe.

The term "pentagonal shape" or "triangular shape" herein includes not only a pentagonal or triangular shape in the strict sense but also a generally pentagonal or triangular shape that may reflect limitations in production technique, a molding error, etc. Similarly, the terms used herein to specify shapes or geometric conditions, such as "parallel", "perpendicular", "symmetrical", "integral multiple" etc., should not be bound to their strict sense, and should be construed to include equivalents or resemblances from which the same optical function or effect can be expected.

The second unit optical elements 55 will now be described. The second unit optical elements 55 are provided in between the first optical elements 50 on the one-side surface 41 of the body portion 40. Particularly in this embodiment, the second unit optical elements 55 are disposed in the entire area of those portions of the one-side surface 41 of the body portion in which no first unit optical element 50 is provided. Because of the arrangement of the first unit optical elements 50 each having a width Wa which varies in the above-described manner, the second unit optical elements 55 are provided in those areas which each contain the end position Pe, lying on the light entrance surface 33 or 34, on the one-side surface 41 of the body portion 40.

As shown in FIGS. 3 and 4, in this embodiment the second unit optical elements 55 are arranged on the one-side surface 41 of the body portion 40 in a direction intersecting the first direction and parallel to the one-side surface 41 of the body portion 40. Each second unit optical element 55 extends linearly on the one-side surface 41 of the body portion 40 in a direction intersecting the arrangement direction. Particularly in this embodiment, the second unit optical elements 55 are arranged in the same arrangement direction as the first unit optical elements 50. Thus, in this embodiment the second unit optical elements 55 are arranged in the second direction perpendicular to the first direction. Further, in this embodiment each second unit optical element 55 extends in a straight line along the first direction perpendicular to the arrangement direction. Thus, the first unit optical elements 50 and the second unit optical elements 55 extend parallel to each other and each extend in a linear line.

The cross-sectional shape of each second unit optical element 55 in the main cross-section parallel to both the arrangement direction (second direction) of the first unit optical elements 50 and the normal direction nd of the one-side surface 41 of the body portion 40 (plate plane of the light guide plate 30) will now be described with reference mainly to FIGS. 6 and 7. As described above, each first unit optical element 50 gradually increases its width Wa and height Ha along the first direction from those at each end position Pe to those at the center position Pc; two first unit optical elements 50, adjacent to each other in the arrangement direction, come into contact with each other at the center position Pc. Accordingly, a second unit optical element 55, extending linearly in the first direction, becomes covered by a first unit optical element 50 at a position between each end position Pe and the center position Pc. In other words, the second unit optical element 55 extends linearly in the first direction to the position at which it collides with the first unit optical element 50.

As will be appreciated from FIGS. 6 and 7, each second unit optical element 55 extends in the first direction without a change in the cross-sectional shape in the main cross-section. When expressed more accurately, the cross-sectional shape of each second unit optical element 55 in the main cross-section of the light guide plate is constant along the longitudinal direction of the second unit optical element 55 in that area of the second unit optical element 55 which is not in contact with a first unit optical element 50 on the one-side surface 41 of the body portion 40.

The cross-sectional shape of each second unit optical element 55, not in contact with a first unit optical element 50 on the one-side surface 41 of the body portion 40, will now be described. As described above, the width Wa of each first unit optical element 50 gradually increases along the first direction from that at each end position Pe to that at the center position Pc. Because of the change in the width Wa of each first unit optical element 50, when the light guide plate 30 is viewed from the side of the light exit surface 31 in the normal direction nd of the one-side surface 41 of the body portion 40, the proportion of the area occupied by the second unit optical elements 55 in the light exit surface 31 is larger in the end area Ae, containing the light entrance surface-side end position Pe on the one-side surface 41 and extending between both ends of the one-side surface 41 in the second direction, than in the central area Ac containing the center position Pc on the one-side surface 41 and extending between both ends of the one-side surface 41 in the second direction.

Thus, the second unit optical elements 55 are provided in a higher proportion in the end area Ae lying in the vicinity of the light source 24a or 24b than in the central area Ac where brightness is best perceived by a viewer. It is therefore preferred that the cross-sectional shape of each second unit optical element 55 in the main cross-section be the same as the above-described cross-sectional shape of each first unit optical element 50 in the main cross-section (or the end surface) in each end area Ae.

In particular, it is preferred that the ratio (Hb/Wb) of the height Hb in the front direction to the width Wb in the arrangement direction (second direction) in each second unit optical element 55 in the main cross-section be relatively low. More specifically, the ratio (Hb/Wb) of the height Hb to the width Wb in each second unit optical element 55 in the main cross-section at any position, particularly in the main cross-section (end surface) at the end position Pe, is preferably lower than the ratio of the height Ha to the width Wa in each first unit optical element 50 in the main cross-section in the central area Ac, particularly in the main cross-section at the center position Pc. Such second unit optical elements 55 can prevent too high brightness in each end area Ae, corresponding to an end area of the display surface 11 where brightness is less perceived by a viewer.

Furthermore, in the main cross-section of each second unit optical element 55 at any position, particularly in the main cross-section (end surface) at the end position Pe, the ratio (Hb/Wb) of the height Hb in the front direction to the width Wb in the arrangement direction (second direction) preferably takes a low value not less than 0, in particular not less than 0.05 and not more than 0.3. Such second unit optical elements 55 can effectively prevent variation in brightness from being produced in those areas of the light exit surface 31 of the light guide plate 30 which lie in the vicinity of the light entrance surfaces 33, 34 that face the light sources 24a, 24b, as will be described in more detail later.

Further, it is preferred that the light exit surface angle θa of each second unit optical elements 55 be relatively small. More specifically, the light exit surface angle θa of each second unit optical element 55 (especially at the base end 51b) in the main cross-section at any position, particularly in the main cross-section (end surface) at the end position Pe, is preferably smaller than the light exit surface angle θa of each first unit optical element 50 (especially at the base end 51b) in the main cross-section in the central area Ac, particularly in the main cross-section at the center position Pc. Such second unit optical elements 55 can prevent too high brightness in each end area Ae, corresponding to an end area of the display surface 11 where brightness is less perceived by a viewer, as will be described in more detail later.

It has also been found by the present inventors that in the main cross-section at any position, particularly in the main cross-section (end surface) at the end position Pe, the light exit surface angle θa of each second unit optical element 55 preferably takes a low value not less than 0, in particular more than 10° and not more than 30°. Such second unit optical elements 55 can effectively prevent variation in brightness from being produced in those areas of the light exit surface 31 of the light guide plate 30 which lie in the vicinity of the light entrance surfaces 33, 34 that face the light sources 24a, 24b, as will be described in more detail later.

As shown in FIGS. 6 and 7, the light exit surface angle θa, which is the angle of the light exit-side surface 56 of each second unit optical element 55 with respect to the one-side surface 41 of the body portion 40 in the main cross-section of the light guide plate 30, may be constant in the light exit-side surface 56 of the second unit optical element 55 between the apex (top) 56a, the farthest point from the one-side surface 41 of the body portion 40, and the base end (end portion) 56b, the closest portion to the one-side surface 41 of the body portion 40. Thus, the light exit-side surface 56 of each second unit optical element 55 may consist of a pair of flat inclined surfaces each extending from the apex (top) 56a to each base end 56b. Alternatively, the light exit surface angle θa, which is the angle of the light exit-side surface 56 of each second unit optical element 55 with respect to the one-side surface 41 of the body portion 40 in the main cross-section of the light guide plate 30, may change in at least one portion or region between the apex 56a and each base end 51b in the light exit-side surface 56 of the second unit optical element 55 such that the light exit surface angle θa solely increases, i.e. never decreases, from that at the apex 56a to that at the base end 56b.

The illustrated cross-sectional shape of the exemplary second unit optical element 55 in the main cross-section is the same as the cross-sectional shape of that area of the first unit optical element 50 in the main cross-section which contains the apex 51a, the farthest point from the one-side surface 41 of the body portion 40. Particularly in this embodiment, the cross-sectional shape of each second unit optical element 55 in the main cross-section is the same as the cross-sectional shape of each first unit optical element 50 in the main cross-section or the end surface at the light entrance surface-side end position on the one-side surface 41 of the body portion 40. Thus, in the main cross-section (end surface) of the light guide plate at the end position Pe on the one-side surface 41, shown in FIG. 7, the first unit optical element 50 and the second unit optical element 55 have the same cross-sectional shape.

Therefore, as shown in FIGS. 6 and 7, each second unit optical element 55 does not include the steeply inclined surfaces (second inclined surfaces) 37b, 38b in the main cross-section, and has a triangular cross-sectional shape, whose corner(s) may be chamfered, defined by the gently inclined surfaces (first inclined surfaces) 37a, 38a and the one-side surface 41 of the body portion 40. The cross-sectional shape of each second unit optical element 55 in the main cross-section is symmetrical with respect to the front direction nd. In the second unit optical elements 55 shown in FIG. 6, the light exit surface angle θa1 of the gently inclined surfaces 37a, 38a is more than 10° and not more than 30°. The ratio (Hb/Wb) of the height Hb to the width Wb in each second unit optical element 55 is not less than 0.05 and not more than 0.3.

The arrangement pitch Pa of the first unit optical elements 50 in the arrangement direction (second direction) is equal to an integral multiple of, e.g. five times, the arrangement pitch Pb of at least two second unit optical elements 55 disposed between two adjacent first unit optical elements 50. If an interference pattern is formed due to the arrangement pitch Pa of the first unit optical elements 50 and the arrangement pitch Pb of the second unit optical elements 55, the special frequency of the interference pattern is low, i.e. the pitch of bright and dark stripes of the interference pattern is small, when the pitches Pa and Pb have the above relationship. The interference pattern can therefore be made hardly visible.

The light guide plate 30 may have the following dimensions: The arrangement pitch Pa of the first unit optical elements 50 may be not less than 25 μm and not more than 200 μm, while the arrangement pitch Pb of the second unit optical elements 55 may be not less than 5 μm and not more than 20 μm. When the contour 51 of each first unit optical element 50 and the contour 56 of each second unit optical element 55 in the main cross-section each have a polygonal shape whose corners are chamfered, the chamfered corners preferably have a radius of curvature which is not more than the width of the unit optical element. If the radius of curvature is more than the width of the unit optical element, the unit optical elements cannot perform the expected function. The thickness of the body portion 40 may be in the range of 0.5 mm to 6 mm.

Figure 14:
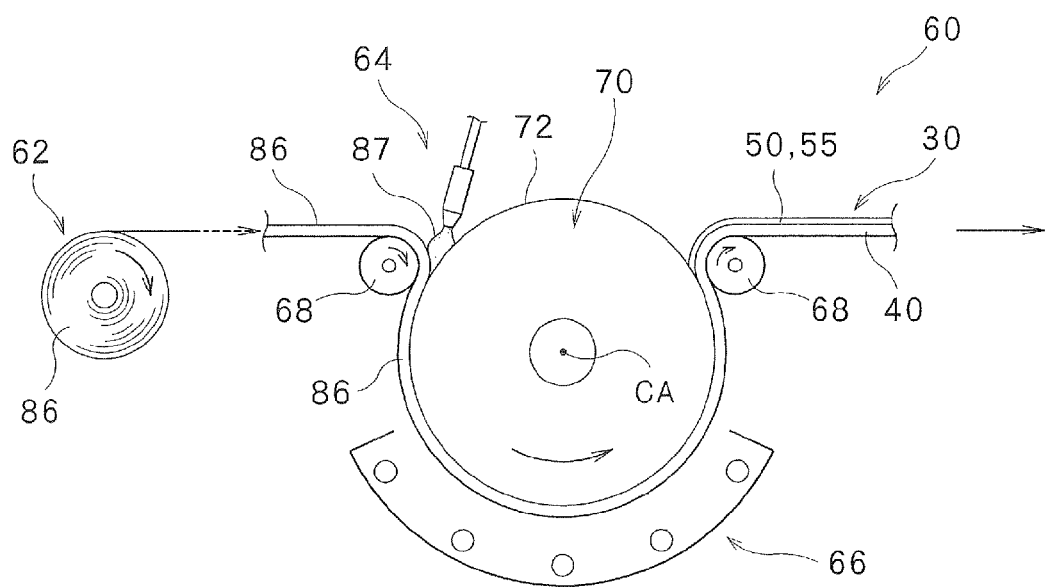
FIG. 14 is a schematic diagram illustrating a light guide plate production method and a light guide plate molding apparatus.

An exemplary method for the production of the thus-constructed light guide plate will now be described. The following description illustrates the production of a light guide plate 30 by shaping of first unit optical elements 50 and second unit optical elements 55 on a substrate 86 by means of a molding apparatus 60 as shown in FIG. 14. A resin which has good moldability and excellent light permeability and is easily available, for example, a reactive resin (e.g. ionizing radiation curable resin) such as an epoxy acrylate resin or a urethane acrylate resin, can be used as a material in the formation of the first unit optical elements 50 and the second unit optical elements 55. A sheet-like material, obtained by co-extrusion of a transparent resin (material for a matrix 44) and a material for a diffusing component 45, can be used as the substrate 86. Materials having excellent mechanical properties, optical properties, stability and processability, and are commercially available at low prices, for example, a resin mainly comprising at least one of acrylate, styrene, polycarbonate, polyethylene terephthalate, acrylonitrile, etc., may be used as the transparent resin. Particles of a transparent material such as silica (silicon dioxide), alumina (aluminum oxide), an acrylic resin, a polycarbonate resin or a silicone resin, having an average particle size (average value of the volume equivalent diameters of particles) of about 0.5 to 100 μm, may be used as the diffusing component 45.

The molding apparatus 60 will be described first. As shown in FIG. 14, the molding apparatus 60 includes a mold 70 having a generally-cylindrical contour. The cylindrical mold 70 has, in its peripheral surface (side surface), a cylindrical mold surface (uneven surface) 72. The cylindrical mold 70 has a central axis CA passing through the center of the peripheral surface of the cylinder, in other words, passing through the center of the cross-section of the cylinder. The mold 70 is configured as a roll mold which, while rotating on the central axis CA as the axis of rotation (see FIG. 14), molds the light guide plate 30 as a molded product.

As shown in FIG. 14, the molding apparatus 60 further includes a molding substrate supply apparatus 62 for supplying a strip-shaped substrate 86, a material supply apparatus 64 for supplying a material 87 having fluidity between the substrate 86 supplied and the mold surface 72 of the mold 70, and a curing apparatus 66 for curing the material 87 between the substrate 86 and the uneven surface 72 of the mold 70. The curing apparatus 66 may be configured appropriately depending on the curing properties of the material 87 to be cured.

Figure 15:
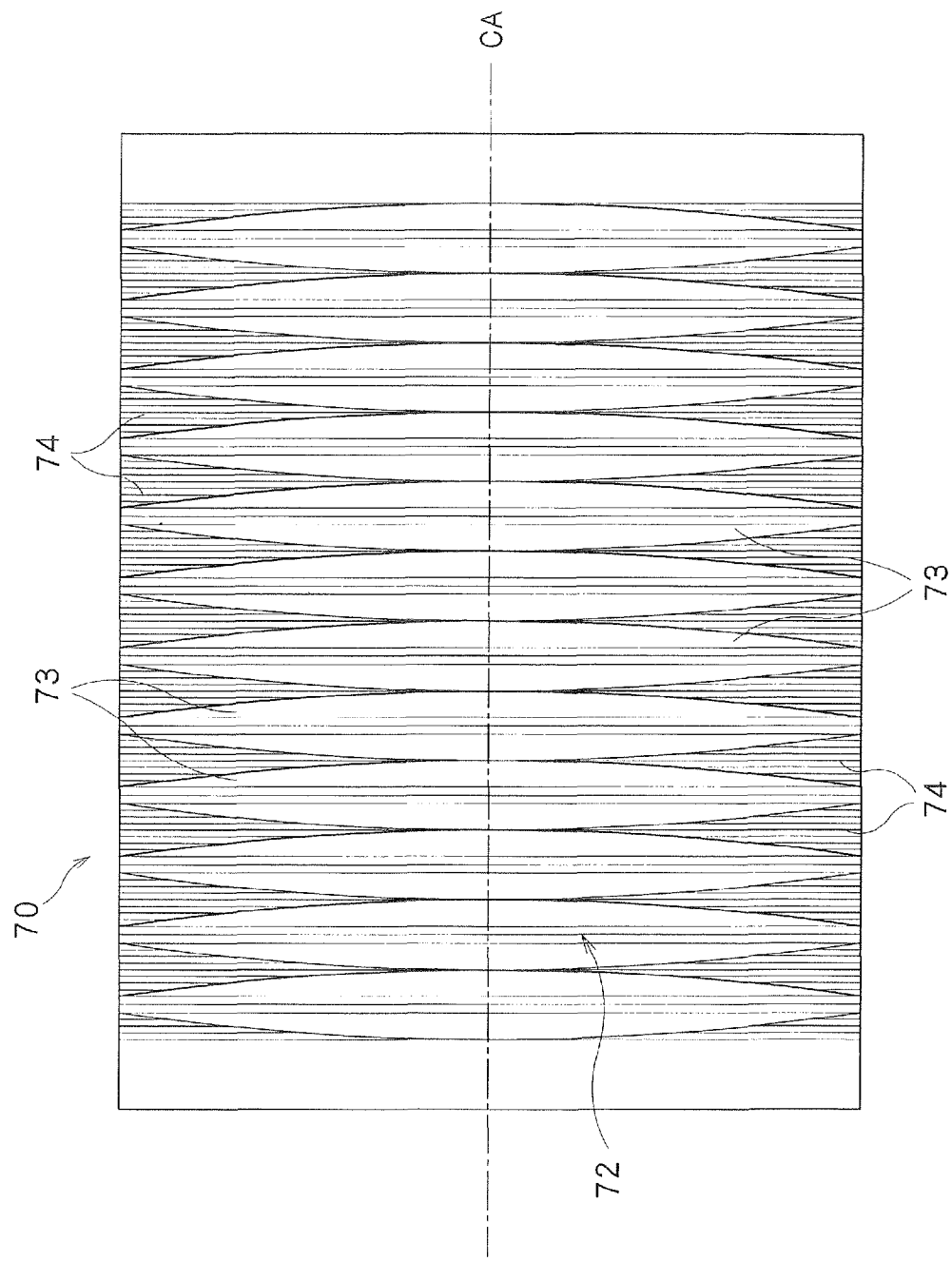
FIG. 15 is a plan view showing the mold surface of a mold incorporated into the molding apparatus of FIG. 14.

FIG. 15 shows the mold surface 72 of the mold 70 when the cylindrical surface 72 is developed along the direction parallel to the central axis CA into a planar surface. The mold surface 72 has first grooves 73, corresponding to the first unit optical elements 50, and second grooves 74, corresponding to the second unit optical elements 55. The first grooves 73 and the second grooves 74 can be produced in the following manner.

Figure 16:
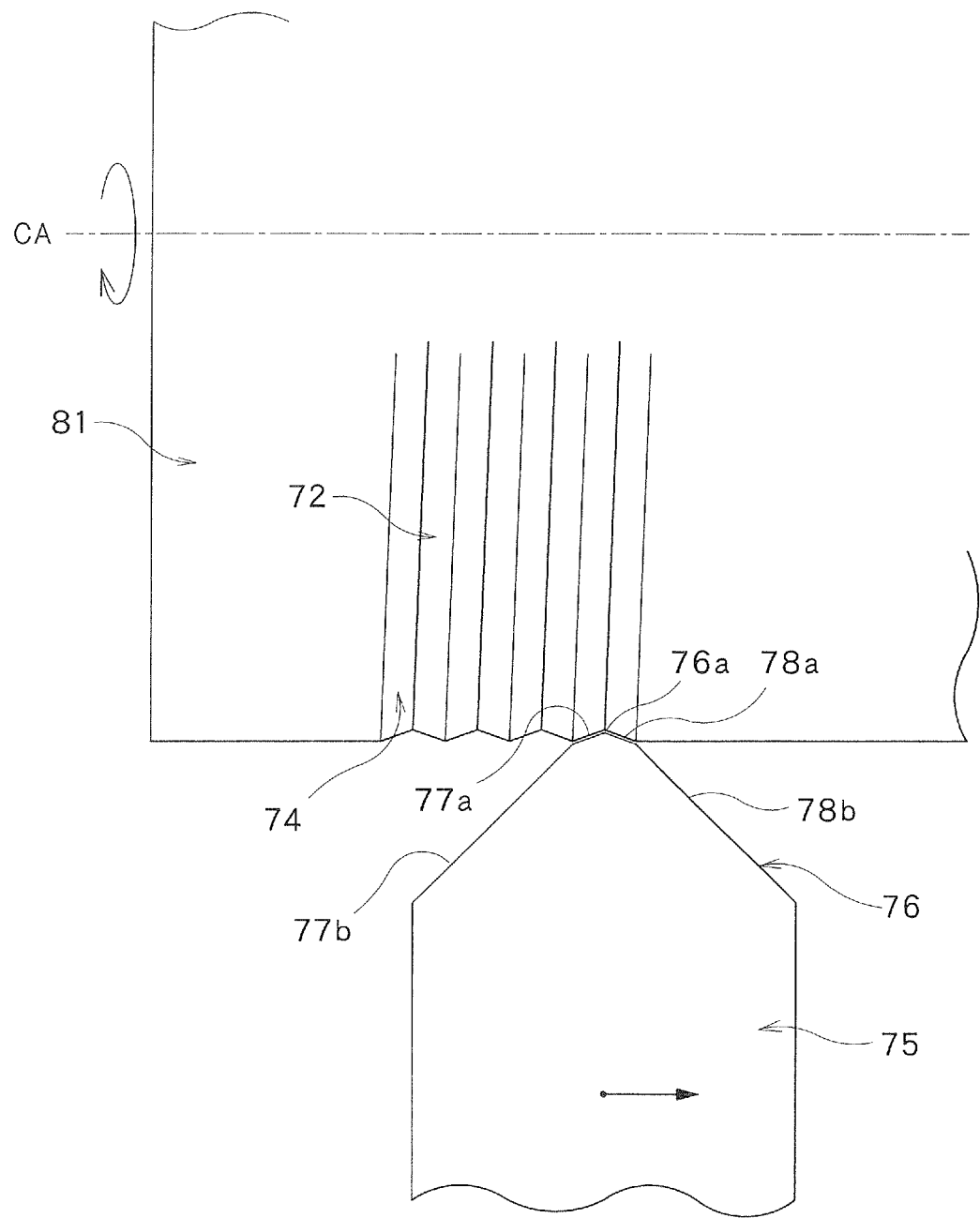
FIG. 16 is a diagram illustrating a method for producing the mold incorporated into the molding apparatus of FIG. 14.

First, as shown in FIG. 16, while rotating a cylindrical mold substrate 81 on its central axis CA, a cutting tool 75 is moved in a direction perpendicular to the central axis CA and caused to cut into the mold substrate 81. Next, the cutting tool 75 is moved in a direction parallel to the central axis CA while rotating the mold substrate 81 on the central axis CA. As a result, a spiral groove having a constant cross-sectional shape can be formed in the peripheral surface of the mold substrate 81. As illustrated in FIG. 16, the segments of the groove are formed side by side with no space therebetween on the peripheral surface of the mold substrate 81.

Upon the formation of the spiral groove, after forming a predetermined number of turns of the groove, i.e. after rotating the mold substrate 81 a predetermined number of times while moving the cutting tool 75 along the central axis CA, the cutting tool 75 is also moved with respect to the mold substrate 81 in a direction perpendicular to the central axis CA while continuing the movement of the cutting tool 75 along the central axis CA. In particular, during one-half rotation of the mold substrate 81, the cutting tool 75 is moved in a direction in which it cuts into the mold substrate 81 and, during the subsequent one-half rotation of the mold substrate 81, the cutting tool 75 is moved in a direction away from the mold substrate 81. By thus moving the cutting tool 75 in a direction perpendicular to the central axis CA and closer to or away from the rotating mold substrate 81, in addition to moving the cutting tool 75 in a direction parallel to the central axis CA, first grooves 73, each having varying depth, can be formed in the proportion of one groove to the predetermined number of turns. When producing a mold 70 for use in the formation of the first unit optical elements 50 and the second unit optical elements 55 of the above-described light guide plate 30, having the first and second elements in the proportion of one to four, the cutting tool 75 is moved also in a direction perpendicular to the central axis CA during every fifth rotation of the mold substrate 81.

Figure 17:
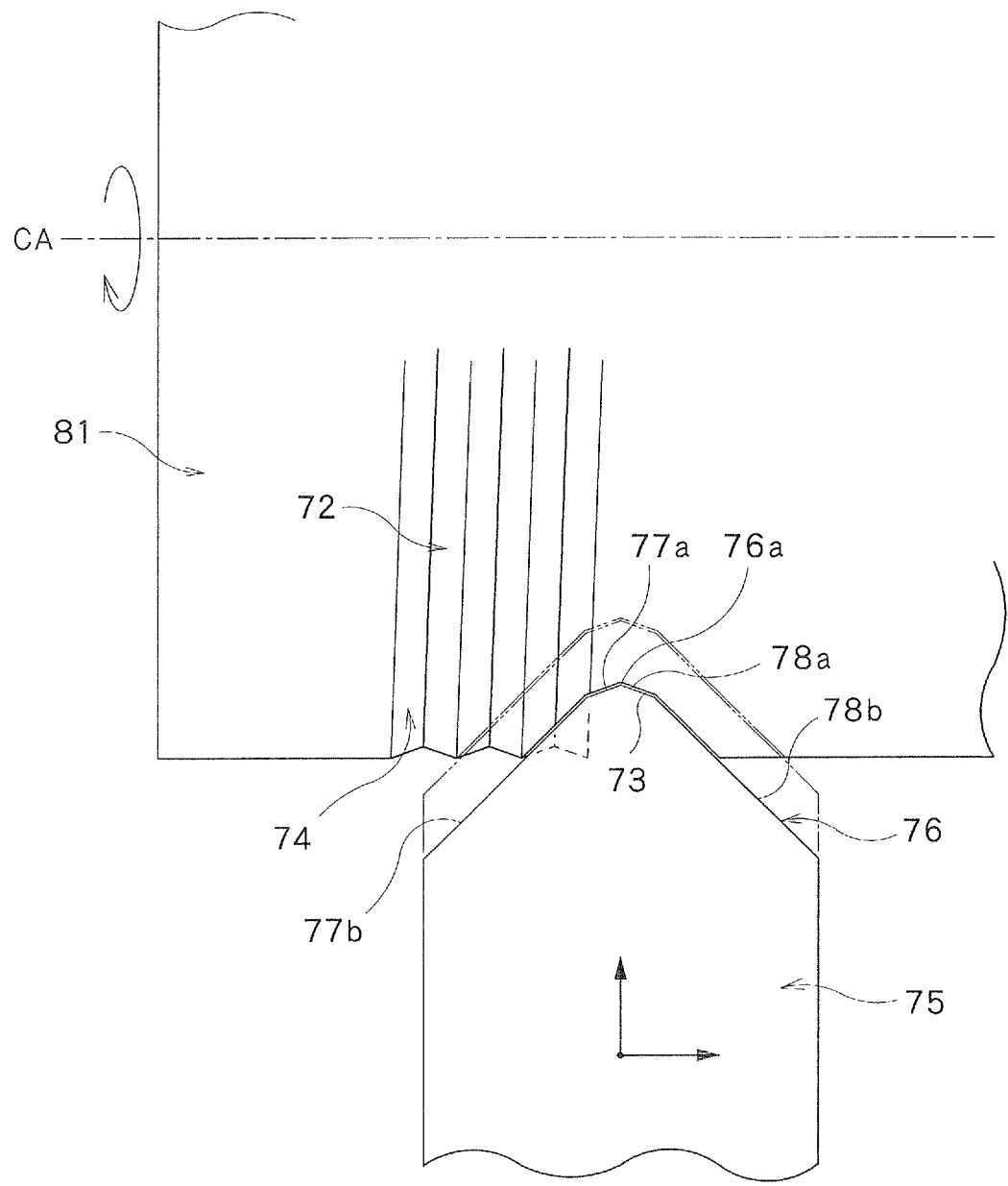
FIG. 17 is a diagram illustrating a method for producing the mold incorporated into the molding apparatus of FIG. 14.

As shown in FIGS. 16 and 17, the contour of the blade 76 of the cutting tool 75 (the shape of the blade edge) includes a portion identical to the contour 51 of the first unit optical element 50 in the main cross-section at the center position Pc. Thus, the blade 76 of the cutting tool 75 includes a pair of first blade portions 77a, 78a, corresponding to the pair of gently inclined surfaces 37a, 38a, on both sides of a blade top 76a, and a pair of second blade portions 77b, 78b, corresponding to the pair of steeply inclined surfaces 37b, 38b, in positions connecting with the first blade portions 77a, 78a. When the second grooves 74 for shaping of the second unit optical elements 55 are being produced, only the first blade portions 77a, 78a are kept in contact with the mold substrate 81 and a constant cut-in depth is maintained, as shown in FIG. 16. When the first grooves 73 for shaping of the first unit optical elements 50 are being produced, on the other hand, not only the first blade portions 77a, 78a but also the second blade portions 77b, 78b are kept in contact with the mold substrate 81 and the cut-in depth is changed with time.

In this manner the first grooves 73 and the second grooves 74 can be formed in the mold substrate 81. According to this method, the first grooves 73 and the second grooves 74, having different shapes, can be formed with the use of the single cutting tool 75. This method thus eliminates the need for replacement of cutting tool during machining of the first grooves 73 and the second grooves 74. Thus, there is no need to perform positioning of a new cutting tool with respect to the mold substrate 81. The first grooves 73 and the second grooves 74 can therefore be formed in the mold surface 81 with high precision. The mold 70, produced by this method, can produce the first unit optical elements 50 and the second unit optical elements 55 with high precision, making it possible to stably impart the expected optical properties to the light guide plate 30.

A method for producing the light guide plate 30 by using the molding apparatus 60 will now be described. First, the strip-shaped substrate 86 is supplied from the molding substrate supply apparatus 62. As shown in FIG. 14, the substrate 86 supplied is fed to the mold 70 and held by the mold 70 and a pair of rollers 68 such that it faces the uneven surface 72 of the mold 70.

As shown in FIG. 14, concomitantly with the supply of the substrate 86, a material 87 having fluidity is supplied from the material supply apparatus 64 to between the substrate 86 and the mold surface 72 of the mold 70. The material 87 is to make the first unit optical elements 50 and the second unit optical elements 55. The expression "having fluidity" herein means that the material 87, supplied to the mold surface 72 of the mole 70, has such a degree of fluidity as to allow the material to enter the recesses (not shown) in the mold surface 72. The following description illustrates an exemplary case in which an ionizing radiation-curable resin is supplied from the material supply apparatus 64. A UV-curable resin to be cured by ultraviolet (UV) irradiation or an EB-curable resin to be cured by electron beam (EB) irradiation, for example, may be used as an ionizing radiation-curable resin.

With an ionizing radiation-curable resin 87 present between the substrate 86 and the mold surface 72 of the mold 70, the substrate 86 passes by the curing apparatus 66. Ionizing radiation having a wavelength suited for the curing properties of the ionizing radiation-curable resin 87 is continually emitted from the curing apparatus 66. The ionizing radiation passes through the substrate 86 and is applied to the ionizing radiation-curable resin 87. When the ionizing radiation-curable resin 87 is a UV-curable resin, the curing apparatus 66 may be comprised of a UV irradiation apparatus, such as a high-pressure mercury lamp. The curing apparatus 66 cures the ionizing radiation-curable resin 87 between the mold surface 72 and the substrate 86 to form first unit optical elements 50 and second unit optical elements 55, made of the cured ionizing radiation-curable resin, on the substrate 86.

Thereafter, as shown in FIG. 14, the substrate 86 is detached from the mold 70 by the right roller 68, and the first unit optical elements 50 and the second unit optical elements 55, formed in the recesses in the mold surface 72, are detached from the mold 70 along with the substrate 86. In this manner, the above-described light guide plate 30 is produced.

In the above-described production method, the substrate 86 may not be in contact with the surface 72 of the mold 70. In this case, a sheet-like portion (land portion), made of the same material 87 as for the first unit optical elements 50 and the second unit optical elements 55, is formed on the substrate 86. Thus, the body portion 40 consists of the substrate 87 and the sheet-like portion (land portion). This method can effectively prevent the molded first unit optical elements 50 and second unit optical elements 55 from partly remaining in the recesses of the mold 70 upon detachment of the unit optical elements from the mold 70.

While the mold 70 rotates one revolution on the central axis CA, the step of supplying the material 87 having fluidity into the mold 70, the step of curing the material 87 in the mold 70 and the step of drawing the cured material 87 from the mold 70 are carried out sequentially on the mold surface 72 of the mold 70 in the above-described manner to produce the light guide plate 30.

The operation of the thus-constructed display device 10 will now be described.

As shown in FIG. 2, light emitted by the light emitters 25 of the light sources 24a, 24b passes through the light entrance surfaces 33, 34 and enters the light guide plate 30. FIG. 2 illustrates, by way of example, light which comes from the first light source 24a and enters the light guide plate 30 through the first light entrance surface 33. The following description illustrates the operations of the surface light source device 20 and the display device 10 with reference to the exemplary light. The light guide plate 30 is constructed symmetrically with respect to the center position Pc in the first direction. The first light source 24a and the second light source 24b are constructed symmetrically on opposite sides of the light guide plate 30 in the first direction. Likewise, the other components of the surface light source device 20, such as the optical sheet 26, and the liquid crystal display panel 15 are symmetrically constructed. Because of the constructional symmetry, the following description holds true for light which comes from the second light source 24b and enters the light guide plate 30 through the second light entrance surface 34.

As shown in FIG. 2, lights L21, L22 that have entered the light guide plate 30 repeat reflection, in particular total reflection at the light exit surface 31 and the back surface 32 due to the difference in refractive index between air and the material of the light guide plate 30, and travels in the first direction (light guide direction) connecting the light entrance surface 33 and the counter surface (the other light entrance surface) 34 of the light guide plate 30.

The body portion 40 of the light guide plate 30 contains the diffusing component 45 dispersed in the matrix. Therefore, as shown in FIG. 2, the directions of the lights L21, L22 traveling in the light guide plate 30 are irregularly changed by the diffusing component 45, and the lights sometimes enter the light exit surface 31 or the back surface 32 at an incident angle which is less than the critical angle for total reflection. Thus, the lights L21, L22 can exit the light exit surface 31 or the back surface 32 of the light guide plate 30. The lights L21, L22 that have exited the light exit surface 31 travel toward the optical sheet 26 disposed on the light exit side of the light guide plate 30. On the other hand, light that has exited the back surface 32 is reflected by the reflective sheet 22 disposed behind the light guide plate 30, and re-enters the light guide plate 30 and travels in the light guide plate 30.

Light traveling in the light guide plate 30 can collide with the diffusing component 45, dispersed in the light guide plate 30, at various places in the light guide plate 30 along the light guide direction. Accordingly, light traveling in the light guide plate 30 exits the light exit surface 31 little by little. Thus, the distribution of the amount of light, exiting the light exit surface 31 of the light guide plate 30, along the light guide direction (the first direction) can be made uniform to a certain extent.

As shown in FIGS. 5 through 7, the light exit surface 31 of the light guide plate 30 consists of the light exit-side surfaces 51, 56 of the unit optical elements 50, 55, the surfaces being inclined with respect to the one-side surface 41 of the body potion 40. The ratio (Ha/Wa) of the height Ha to the width Wa in each first unit optical element 50 in the main cross-section is relatively high. When the ratio (Ha/Wa) is not less than 0.25 and not more than 0.6, the first unit optical elements 50 can very effectively exert an optical effect on light traveling in the light guide plate 30 after being totally reflected at the light exit surface 31 and on light exiting the light guide plate 30 through the light exit surface 31. Further, because of the relatively high ratio of the height Ha to the width Wa in each first unit optical element 50, the light exit-side surface 51 has a relatively high light exit surface angle θa. The steeply inclined surfaces 37b, 38b, when they have a relatively high light exit surface angle θa of more than 30° and not more than 60°, can very effectively exert an optical effect on light traveling in the light guide plate 30 after being totally reflected at the steeply inclined surfaces 37b, 38b and on light exiting the light guide plate 30 through the steeply inclined surfaces 37b, 38b. A description will be given first of the optical effect exerted on light traveling in the light guide plate 30 after being totally reflected at the light exit surface 31.

FIGS. 5 and 6 show, in the main cross-section of the light guide plate 30, the paths of lights L51, L52 which travel in the light guide plate 30 while repeating total reflection at the light exit surface 31 and the back surface 32. As described above, the light exit surface 31 of the light guide plate 30 consists of the light exit-side surfaces 51 of the first unit optical elements 50 and the light exit-side surfaces 56 of the second unit optical elements 55. The light exit-side surface 51 of each first unit optical element 50 is composed of a pair of gently inclined surfaces 37a, 38a which are oppositely inclined with respect to the normal direction nd of the one-side surface 41 of the body portion 40, and a pair of steeply inclined surfaces 37b, 38b which are oppositely inclined with respect to the normal direction nd of the one-side surface 41 of the body portion 40. The light exit-side surface 56 of each second unit optical element 55 is composed of a pair of gently inclined surfaces 37a, 38a which are oppositely inclined with respect to the normal direction nd of the one-side surface 41 of the body portion 40. As shown in FIGS. 5 and 6, lights L51, L61, L62, traveling in the light guide plate 30 toward the light exit surface 31 and entering the light exit surface 31, each in most cases enter an inclined surface which is inclined toward the opposite direction to the traveling direction of the light from the normal direction nd of the one-side surface 41 of the body portion 40 in the main cross-section.

Consequently, as shown in FIGS. 5 and 6, the lights L51, L61, L62, traveling in the light guide plate 30, in most cases when they totally reflect at the light exit surface 31, reduce a component along the second direction. Thus, the light exit surface 31 of the light guide plate 30 prevents light, which is being guided in the light guide plate 30, from keeping traveling toward only one side in the second direction. This optical effect is produced especially by the first unit optical elements 50 whose height-to-width ratio in the main cross-section is relatively high, in particular not less than 0.25 and not more than 0.6. Thus, this optical effect is produced mainly by the steeply inclined surfaces 37b, 38b having a relatively large light exit surface angle θa, in particular more than 30° and not more than 60°. When light L51 or L61 enters a steeply inclined surface 37b or 38b, having a relatively large light exit surface angle θa of more than 30° and not more than 60°, the light component along the second direction, due to total reflection at the steeply inclined surface 37b or 38b, is likely to be directed toward the opposite direction. Thus, light such as light L51 or L61, entering a steeply inclined surface 37b or 38b, tends to totally reflect at the steeply inclined surface 37b or 38b and to thereby reverse its traveling direction in the second direction.

In this manner, the light exit surface 31 of the light guide plate 30, especially the steeply inclined surfaces 37b, 38b constituting part of the light exit surface 31, restricts light, emitted radially from a light emitting point, from keeping spreading out in the second direction. Thus, light which has been emitted from a light emitter of the light source 24a or 24b and entered the light guide plate 30 in a direction highly inclined with respect to the first direction, comes to travel mainly in the first direction while the traveling of the light in the second direction is restricted. This makes it possible to adjust the distribution of the amount of light, exiting the light exit surface 31 of the light guide plate 30, in the second direction by the construction of the light sources 24a, 25b (e.g. the arrangement of the light emitters 25), the output of each light emitter 25, etc.

In this embodiment the first unit optical elements 50 are arranged side by side in the second direction although the second unit optical elements 55 are arranged in between the first unit optical elements 50. Light, which is being guided in the light guide plate 30, can therefore be effectively prevented from keeping traveling toward only one side in the second direction.

The width Wa of each first unit optical element 50, especially the width of the portion defined by the pair of the steeply inclined surfaces 37b, 38b (the length of the pair of the steeply inclined surfaces 37b, 38b, as orthographically projected onto the one-side surface 41 of the body portion 40, in the arrangement direction (second direction)), increases with distance from the light source 24a or 24b in the first direction. Accordingly, when viewed from the front, the proportion of the area occupied by the first unit optical elements 50 on the one-side surface 41 of the body portion 40, especially the proportion of the area occupied by the steeply inclined surfaces 37b, 38b of the first unit optical elements 50 on the one-side surface 41 of the body portion 40, increases with distance from the light source 24a or 24b in the first direction. This allow light, which has been emitted by a light emitter 25 and is being guided in the light guide plate 30, to travel in the second direction in the vicinity of the light source 24a or 24b while effectively restricting the traveling of the light in the second direction in an area remote from the light source 24a or 24b. The light guide plate 30 of this embodiment can therefore effectively prevent variation of brightness, corresponding to the arrangement of the light emitters 25 of the light sources 24a, 24b, from being produced.

A description will now be given of an optical effect exerted on light passing through the light exit surface 31 and exiting the light guide plate 30. As shown in FIGS. 5 and 6, lights L51, L61, L63 exiting the light guide plate 30 through the light exit surface 31, are refracted at the light exit-side surfaces 51 of the first unit optical elements 50 and the light exit-side surfaces 56 of the second unit optical elements 55, constituting the light exit surface 31 of the light guide plate 30. Due to the refraction, the lights L51, L61, L63, each traveling in a direction inclined from the front direction nd, are bent such that the angle of the traveling direction (exit direction) of each light with respect to the front direction in the main cross-section becomes smaller. Thus, the unit optical elements 50, 55 can reduce a light component along the second direction perpendicular to the light guide direction and narrow the traveling direction of transmitted light down to the front direction nd. The unit optical elements 50, 55 thus exert a light condensing effect on a light component traveling in the second direction perpendicular to the light guide direction. In this manner, the exit angle of light exiting the light guide plate 30 is narrowed down to a narrow angular range around the front direction in a plane parallel to the arrangement direction of the unit optical elements 50, 55 of the light guide plate 30.

The light condensing effect on a light component along the second direction is produced especially by the first unit optical elements 50 whose height-to-width ratio in the main cross-section is relatively high, in particular not less than 0.25 and not more than 0.6. Thus, the light condensing effect is produced mainly by the steeply inclined surfaces 37b, 38b having a relatively large light exit surface angle θa, in particular more than 30° and not more than 60°. The steeply inclined surfaces 37b, 38b, having a relatively large light exit surface angle θa of more than 30° and not more than 60°, can effectively narrow the traveling direction of light, containing a high percentage of a component traveling in the second direction and traveling in a direction highly inclined from the front direction nd, down to the front direction nd. On the other hand, the steeply inclined surfaces 37b, 38b reflect light whose traveling direction cannot be narrowed down to the front direction nd, e.g. light containing only a low percentage of a component traveling in the second direction, and does not allow such light to exit the light exit surface 31 of the light guide plate 30. Typically, as shown in FIG. 5, the steeply inclined surfaces 37b, 38b retroreflect light L52 traveling in the front direction nd or in a direction only slightly inclined from the front direction nd in the main cross-section of the light guide plate 30. The steeply inclined surfaces 37b, 38b, having a relatively large light exit surface angle θa of more than 30° and not more than 60°, thus exert an excellent light condensing effect on a light component along the second direction.

In this embodiment the width Wa of each first unit optical element 50, especially the width of the portion defined by the pair of the steeply inclined surfaces 37b, 38b (the length of the pair of the steeply inclined surfaces 37b, 38b, as orthographically projected onto the one-side surface 41 of the body portion 40, in the arrangement direction (second direction)), increases with distance from the light source 24a or 24b in the first direction. Accordingly, when viewed from the front, the proportion of the area occupied by the first unit optical elements 50 on the one-side surface 41 of the body portion 40, especially the proportion of the area occupied by the steeply inclined surfaces 37b, 38b of the first unit optical elements 50 on the one-side surface 41 of the body portion 40, increases with distance from the light source 24a or 24b in the first direction. Particularly in the center position Pc on the one-side surface 41 of the body portion 40, the second unit optical elements 55 are not provided and only the first unit optical elements 50 are provided. Therefore, brightness can be effectively increased in a central area of the display surface 11 where variation in brightness is most perceivable by a viewer.

Further, the first unit optical elements 50 whose height-to-width ratio (Ha/Wa) in the main cross-section is relatively high, in particular not less than 0.25 and not more than 0.6, can produce a higher light extracting effect as compared to the second unit optical elements 55 or to a flat surface parallel to the one-side surface 41. The light emitters 25, constituting the light sources 24a, 25a, each emit light not only in a direction parallel to the first direction but generally radially around the first direction. Consequently, a high percentage of light, having a second-direction component, tends to exist in the light guide plate 30 especially when the light sources 24a, 24b are each comprised of not a linear cold-cathode fluorescent lamp but an assembly of the point-like light emitters 25. The first unit optical elements 50 having a relatively high height-to-width ratio (Ha/Wa) of not less than 0.25 and not more than 0.6, or the steeply inclined surfaces 37b, 38b having a relatively large light exit surface angle θa of more than 30° and not more than 60°, can facilitate exit of light, having a second-direction component, from the light exit surface 31 of the light guide plate 30. The light extracting effect of the first unit optical elements 50 will now be described with reference to FIGS. 8 through 12.

Figure 8:
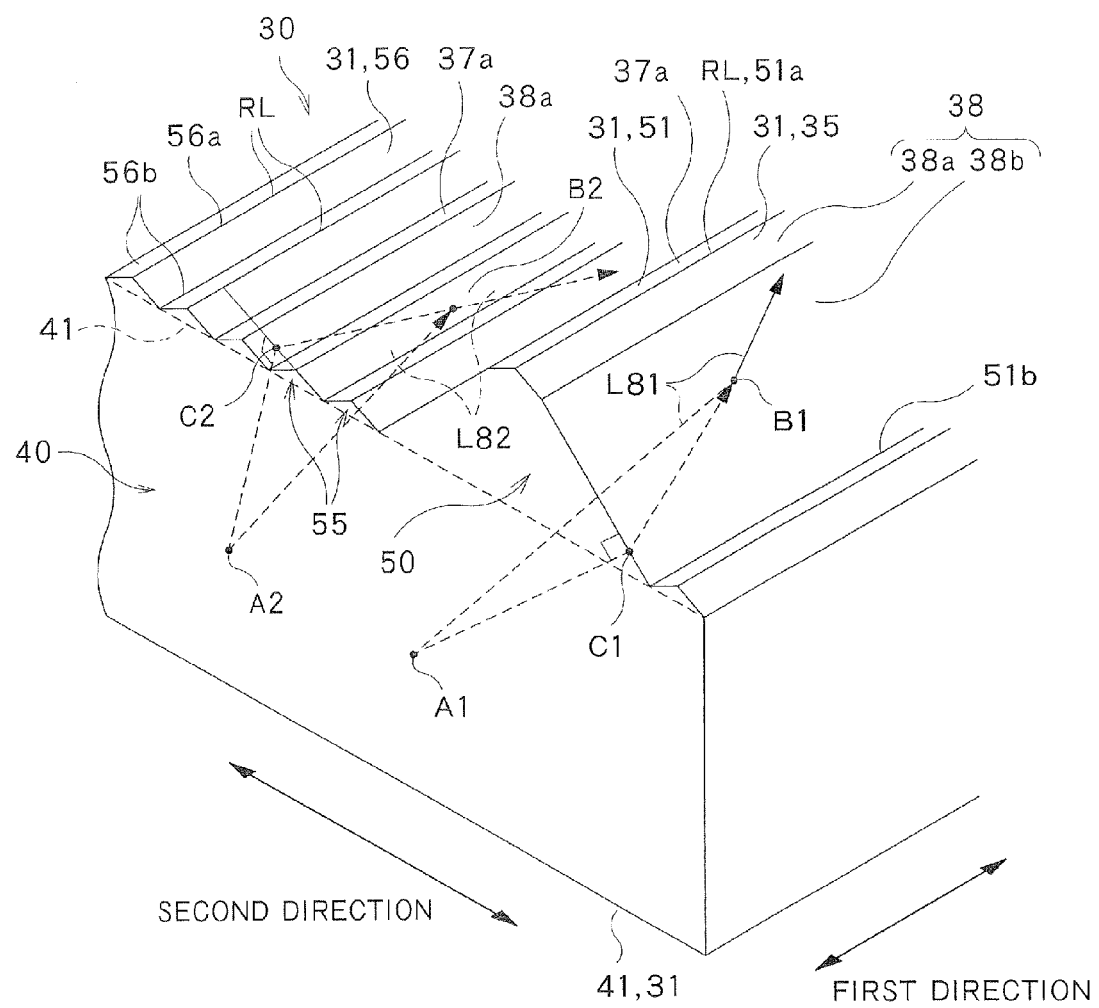
FIG. 8 is a partial perspective view of the light guide plate, illustrating the action of the light guide plate.
Figure 9:
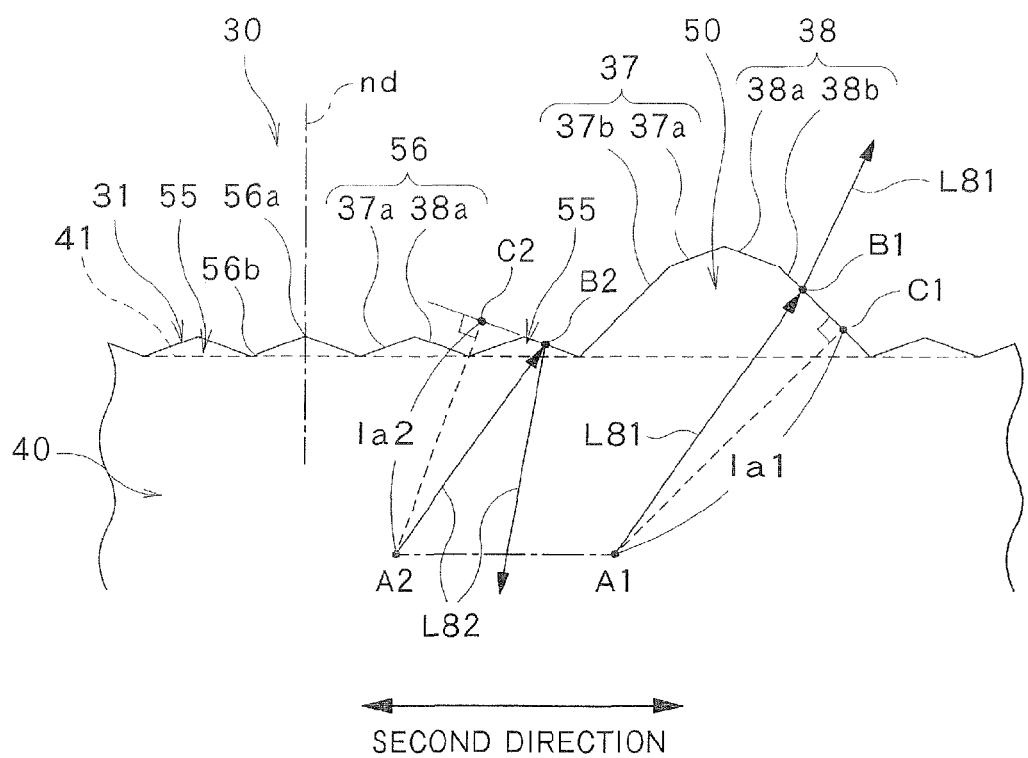
FIG. 9 is a diagram showing the light guide plate of FIG. 8 as viewed in a first direction.
Figure 10:
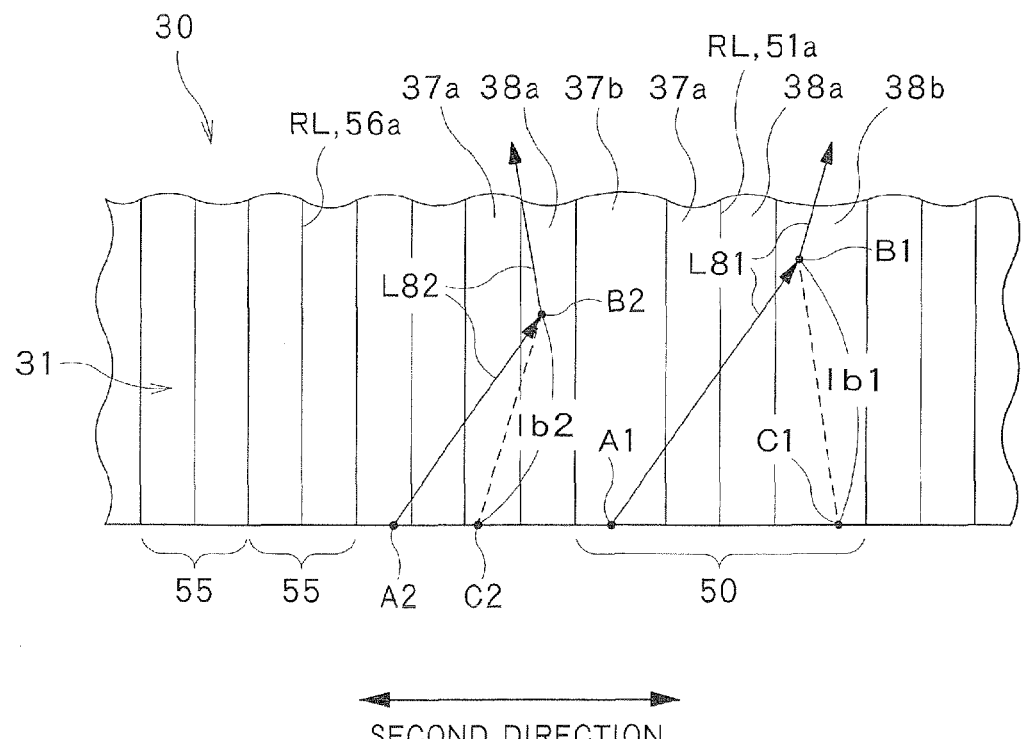
FIG. 10 is a diagram showing the light guide plate of FIG. 8 as viewed in the normal direction of a one-side surface a body portion.

FIGS. 8 through 12 illustrate two light rays that enter the light exit surface 31 of the light guide plate 30. In particular, FIG. 8 shows light L81 that enters the steeply inclined surface 38b of a first unit optical element 50 in the light exit surface 31, and light L82 that enters the gently inclined surface 38a of a second unit optical element 55. FIGS. 9 and 10 show, together with the lights L81, L82, the light guide plate 30 shown in the perspective view of FIG. 8, as viewed in the first direction and in the front direction, respectively. The lights L81, L82 shown in FIGS. 8 through 10 travel parallel to each other in the light guide plate 30.

With reference to the light L81 of the two light rays shown in FIGS. 8 through 10, which enters the steeply inclined surface 38b of a first unit optical element 50 in the light exit surface 31, whether the light L81 is refracted or totally reflected at the steeply inclined surface 38b can be determined based on the Snell's law after determining an incident angle θe of the light L81, incident on the interface (steeply inclined surface 38b), in a plane perpendicular to the steeply inclined surface 38b and containing the path of light L81 to the steeply inclined surface 38b. In particular, the incident angle θe of the light L81 incident on the steeply inclined surface 38b is determined in the plane shown in FIG. 11, containing an incident point B1 on the steeply inclined surface 38b at which the light L81 enters the steeply inclined surface 38b, a pass point A1 on the path of light L81 to the incident point B1, and an intersection point (position of the foot of perpendicular) C1 between the perpendicular from the pass point A1 to a plane containing the steeply inclined surface 38b and the plane. A determination is then made as to whether the incident angle θe exceeds the critical angle for total reflection.

Similarly, with reference to the light L82 of the two light rays shown in FIGS. 8 through 10, which enters the gently inclined surface 38a of a second unit optical element 55 in the light exit surface 31, whether the light L82 is refracted or totally reflected at the gently inclined surface 38a can be determined based on the Snell's law after determining an incident angle θe of the light L82, incident on the interface (gently inclined surface 38a), in a plane perpendicular to the gently inclined surface 38a and containing the path of light L82 to the gently inclined surface 38a. In particular, the incident angle θe of the light L82 incident on the gently inclined surface 38a is determined in the plane shown in FIG. 12, containing an incident point B2 on the gently inclined surface 38a at which the light L82 enters the gently inclined surface 38a, a pass point A2 on the path of light L82 to the incident point B2, and an intersection point (position of the foot of perpendicular) C2 between the perpendicular from the pass point A2 to a plane containing the gently inclined surface 38a and the plane. A determination is then made as to whether the incident angle θe exceeds the critical angle for total reflection.

Figure 11:
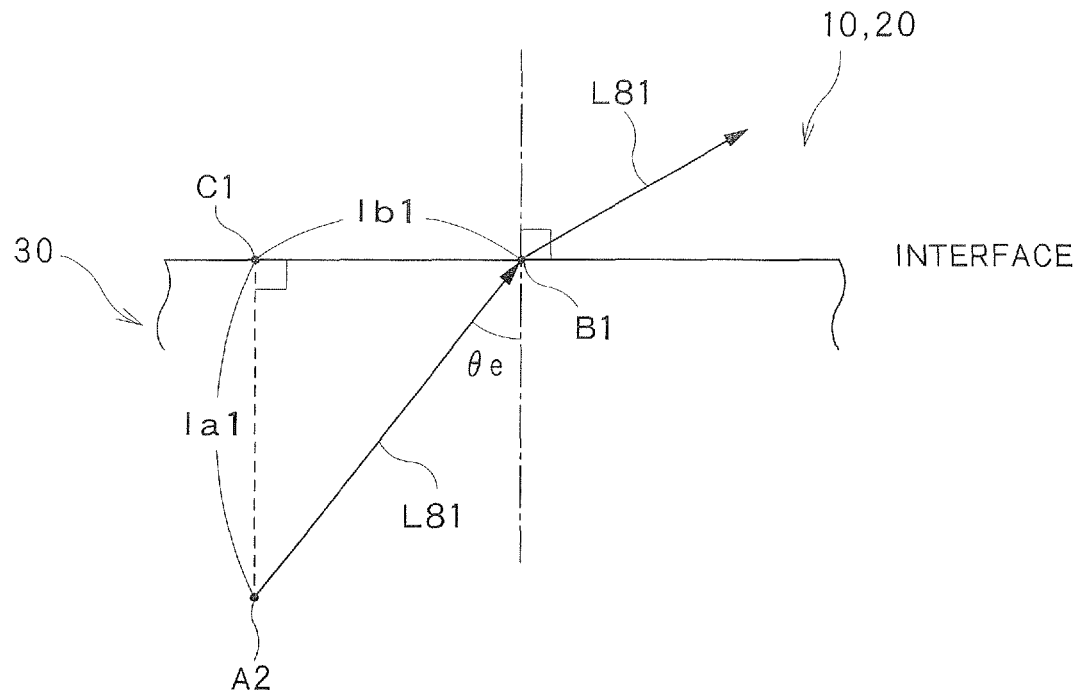
FIG. 11 is a diagram showing a plane containing the points A1, B1 and C1 shown in FIG. 8.
Figure 12:
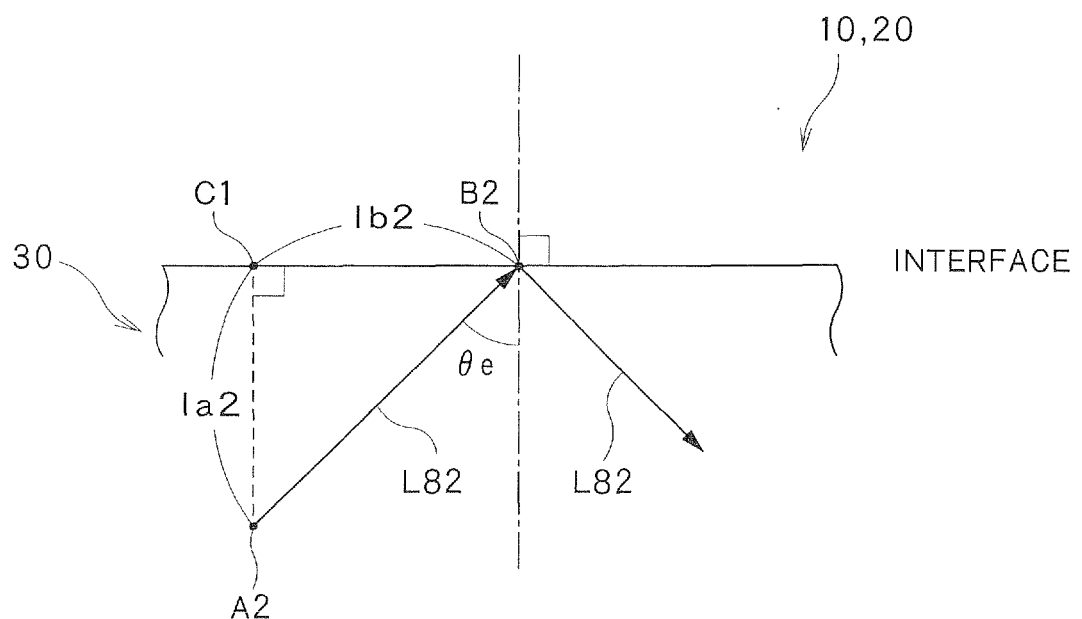
FIG. 12 is a diagram showing a plane containing the points A2, B2 and C2 shown in FIG. 8.
Figure 13:
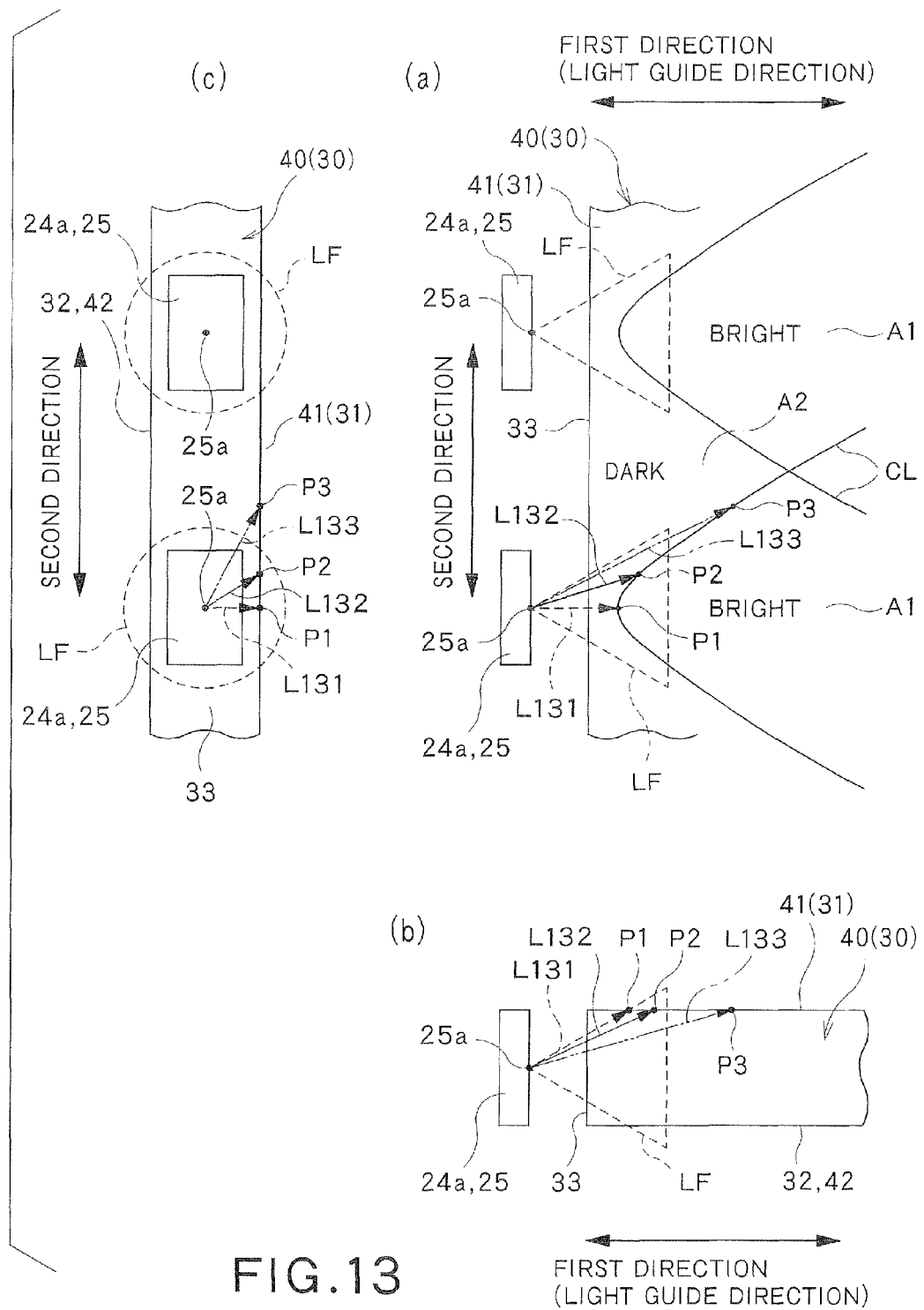
FIGS. 13(*a*) through 13(*c*) are diagrams illustrating the action of the light guide plate in the vicinity of its light entrance surface, and showing the path of source light that enters the body portion of the light guide plate, FIG. 13(*a*) being a plan view showing the light guide plate, from which its unit optical elements are omitted, as viewed from the side of the light exit surface, FIG. 13(*b*) being a diagram showing the light guide plate, from which its unit optical elements are omitted, as viewed in a direction (second direction) parallel to both the light exit surface and the light entrance surface, and FIG. 13(*c*) being a diagram showing the light guide plate, from which its unit optical elements are omitted, as viewed from the side of the light entrance surface.

As will be appreciated from FIG. 9 and as shown in FIGS. 11 and 12, the length la1 between the pass point A1 and the intersection point C1 in the case where the light L81 travels through the body portion 41 to a steeply inclined surface 37b or 38b tends to be longer than the length la2 between the pass point A2 and the intersection point C2 in the case where the light L82, having a second-direction component, travels through the body portion 41 to a gently inclined surface 37a or 38a. In addition, as will be appreciated from FIG. 10 and as shown in FIGS. 11 and 12, the length lb1 between the intersection point C1 and the incident point B1 in the case where the light L81 travels through the body portion 41 to a steeply inclined surface 37b or 38b tends to be shorter than the length lb2 between the intersection point C2 and the incident point B2 in the case where the light L82 travels through the body portion 41 to a gently inclined surface 37a or 38a. Accordingly, with reference to common light that travels in the body portion 40, though depending on the percentage of the second-direction component, the incident angle ee of light, incident on the light exit surface 31, is likely to be larger in the case where the light, like L81, travels through the body portion 40 to a steeply inclined surface 37b or 38b than in the case where the light, like L82, travels through the body portion 40 to a gently inclined surface 37a or 38a, as shown in FIGS. 11 and 12.

Therefore, as shown in FIG. 11, when light L81 having a relatively high percentage of a second-direction component enters a steeply inclined surface 37b or 38b in the light exit surface 31, the light L81 is likely to exit the light guide plate 30 without being totally reflected at the surface. As described above with reference to FIGS. 5 and 6 and as shown in FIG. 9, the second-direction component of the light L81 exiting the steeply inclined surface 37b or 38b of a first unit optical element 50, is subjected to the light condensing effect of the steeply inclined surface 37b or 38b. Thus, due to refraction of the light at the steeply inclined surface 37b or 38b, the angle of the traveling direction of the light with respect to the front direction nd in the main cross-section is likely to become smaller. On the other hand, as shown in FIG. 12, light L82 that enters a gently inclined surface 37a or 38a in the light exit surface 31, even when the light L82 has a high percentage of a second-direction component (i.e. even when the traveling direction of the light is highly inclined with respect to the first direction in a front view), is likely to be totally reflected at the gently inclined surface 37a or 38a.

In this embodiment the width Wa of each first unit optical element 50, especially the width of the portion defined by the pair of the steeply inclined surfaces 37b, 38b (the length of the pair of the steeply inclined surfaces 37b, 38b, as orthographically projected onto the one-side surface 41 of the body portion 40, in the arrangement direction (second direction)), increases with distance from the light source 24a or 24b in the first direction. Accordingly, when viewed from the front, the proportion of the area occupied by the first unit optical elements 50 on the one-side surface 41 of the body portion 40, especially the proportion of the area occupied by the steeply inclined surfaces 37b, 38b of the first unit optical elements 50 on the one-side surface 41 of the body portion 40, increases with distance from the light source 24a or 24b in the first direction. Particularly in the center position Pc on the one-side surface 41 of the body portion 40, the second unit optical elements 55 are not provided and only the first unit optical elements 50 are provided. The light guide plate 30 having such a construction can prevent a too large amount of light from exiting the end area Ae (area containing the light entrance surface 33, 34-side end position Pe in the first direction and extending between both ends of the light exit surface 31 in the second direction) of the light exit surface 31, lying in the vicinity of the light source. This makes it possible to ensure a sufficient amount of light exiting the central area Ac (area containing the center position Pc in the first direction and extending between both ends of the light exit surface 31 in the second direction) of the light exit surface 31. Therefore, an image can be displayed brightly in the center of the display surface 11 of the display device 10. It thus becomes possible to equalize the distribution of the amount of light, exiting the light exit surface 31 of the light guide plate 30, along the first direction and, in addition, to effectively increase the brightness of an image, perceived by a viewer, by efficiently using light emitted by the light sources 24a, 24b.

To specify the end area Ae containing the end position Pe in the first direction, it is necessary to determine the length of the end area Ae along the first direction. Basically the length of the end area Ae along the first direction may be determined such that the end area Ae does not overlap with the central area Ac containing the center position Pc in the first direction. In view of the above-described optical effects, the length of the end area Ae along the first direction is preferably set so that the end area Ae faces that area of the display surface 11 of the display device 10 in which a change in the brightness of an image is less perceived by a viewer. In a specific example, the length of the end area Ae along the first direction is set equal to 30% of the overall length of the light exit surface 31 of the light guide plate 30 along the first direction.

On the other hand, the length of the central area Ac along the first direction may be set so that the central area Ac occupies the entire area, other than the end areas Ae, of the light exit surface 31. Alternatively, the length of the central area Ac along the first direction may be set so that the central area Ac faces that area of the display surface 11 of the display device 10 in which a change in the brightness of an image is best perceived by a viewer. In a specific example, the length of the central area Ac, extending around the center position Pc in the first direction, is set equal to 40% of the overall length of the light exit surface 31 of the light guide plate 30 along the first direction.

As described above, light which is being guided in the light guide plate 30 comes to exit the light guide plate 30 through the light exit surface 31 due to the optical effect exerted on the light by the light exit surface 31 of the light guide plate 30, especially by the light exit-side surfaces 51 of the first unit optical elements 50. As shown in FIG. 2, lights L21, L22 that have exited the light exit surface 31 of the light guide plate 30 enter the optical sheet 26. As described above, the optical sheet 26 has the unit prisms 27 each having a triangular cross-sectional shape and projecting toward the light guide plate 30. As well shown in FIG. 2, the longitudinal direction of the unit prisms 27 is parallel to a direction intersecting the light guide direction (the first direction) in which light is guided in the light guide plate 30, and in this embodiment is parallel to the second direction perpendicular to the light guide direction. Due to the difference in refractive index between air and the material of the light guide plate 30, the exit angle of the first-direction component of light exiting the light exit surface 31 of the light guide plate 30 (angle θc formed between the first-direction component of exiting light and the normal direction nd of the plate plane of the light guide plate 30) tends to fall within a particular angular range (e.g. 65°-85°).

It is therefore possible to design the optical sheet 26 so that light that has exited the light exit surface 31 of the light guide plate 30 mostly passes through one prism surface 27a of a unit prism 27 of the optical sheet 26 and enters the unit prism 27, and thereafter totally reflects at the other prism surface 27b of the unit prism 27, as shown in FIG. 2. Due to the total reflection at the prism surfaces 27b of unit prisms 27, the lights L21, L22, each traveling in a direction inclined from the front direction nd in the cross-section of FIG. 2 (cross-section parallel to both the first direction and the front direction nd), are bent such that the angle of the traveling direction of each light with respect to the front direction nd becomes smaller. Thus, with reference to a light component along the first direction (light guide direction), the unit prisms 27 can narrow the traveling direction of the transmitted light down to the front direction nd. The optical sheet 26 thus exerts a light condensing effect on a light component along the first direction.

Light whose traveling direction is thus significantly changed by the unit prisms 27 of the optical sheet 26 is mainly a light component traveling in the first direction, i.e. the arrangement direction of the unit prisms 27, and thus differs from the light component traveling in the second direction which is condensed by the light exit surface 31 of the light guide plate 30. Accordingly, the front-direction luminance, which has been increased by the unit optical elements 50, 55 of the light guide plate 30, is not impaired but can be further increased by the optical action at the unit prisms 27 of the optical sheet 26.

As described hereinabove, the surface light source device 20 equalizes the distribution of the amount of exiting light along the first direction (light guide direction), increases the front-direction luminance and emits light from the planar light emitting surface 21. Light that has exited the surface light source device 20 enters the liquid crystal display panel 15. The liquid crystal display panel 15 allows light from the surface light source device 20 to pass therethrough selectively for each pixel, so that a viewer can view an image on the liquid crystal display device 10.

As described above, light that has entered the light guide plate 30 comes to travel in the first direction while traveling of the light in the second direction is restricted by the light exit surface 31, especially by the light exit-side surfaces 51 of the first unit optical elements 50. Thus, light emitted by each of the large number of light emitters 25 of the light sources 24a, 24b exits the light exit surface 31 of the light guide plate 30 mainly from a certain area which lies in a certain range in the second direction and extends in the first direction. Therefore, the control device 18 may adjust the output of each light emitter 25 according to an image to be displayed on the display surface 11 of the display device 10.

For example, when no image is to be displayed, in other words, a black area is to be displayed in a particular area of the display surface 11 of the display device 10, it is possible to turn off a point-like light emitter 25 which supplies light to that area of the light exit surface 31 of the light guide plate 30 which corresponds to the particular area of the display surface 10. This can solve the conventional problem of poor contrast due to incomplete blocking by the display panel 15 of illuminating light from the surface light source device 20. Further, this can reduce the amount of power, and thus is preferred also from the viewpoint of energy saving.

Besides the case of displaying a black area, it is possible to adjust the output of each point-like light emitter 25 according to an image to be displayed on the display surface 11, thereby adjusting brightness in various areas of a displayed image without solely resorting to the display panel 15. This also can enhance the contrast in a displayed image and achieve energy saving.

With environmental concerns growing these days, light emitting diodes are attracting attention for use as light emitters in a light source. Light emitting diodes are far superior in energy efficiency to cold-cathode fluorescent lamps which have been commonly used as light emitters for light sources. However, it has been found by the present inventors that when a linear array of point-like light emitters, such as light emitting diodes, is used as a light source, in place of the conventional light source comprised of a cold-cathode fluorescent lamp, in a surface light source device in a display device, variation of brightness, i.e. in-plane variation of luminance, is produced in an area of the light exit surface of a light guide plate, the area lying in the vicinity of the light entrance surface of the light guide plate, or in that area of the light emitting surface of the surface light source device or the display surface of the display device which corresponds to the area of the light exit surface of the light guide plate.

The inventors' researches have revealed that when a linear array of point-like light emitters, such as light emitting diodes, is used as a light source, variation of brightness, in particular a pattern of alternating bright and dark portions, is formed at the same pitch as the arrangement pitch of the point-like light emitters along the arrangement direction (the second direction) of the point-like light emitters in an area of the light exit surface of a light guide plate, lying in the vicinity of the light source-facing light entrance surface of the light guide plate.

Nowadays, a light guide plate is becoming widely used which has prisms extending linearly along the light guide direction (the first direction) and arranged in a direction (the second direction) perpendicular to the light guide direction. The prisms each have the shape of a right triangle in a cross-section perpendicular to the longitudinal direction, and are expected to exert a light condensing effect on a light component parallel to the arrangement direction of the prisms. It has been found by the present inventors that when such unit prisms, having a light condensing effect, are provided in a light guide plate, variation of brightness along the second direction in an area of the light exit surface of the light guide plate, lying in the vicinity of the light entrance surface of the light guide plate, becomes more marked. In particular, variation of brightness along the second direction is produced in a wider area of the light exit surface.

On the other hand, it has turned out that the above-described embodiment of the present invention can effectively prevent the occurrence of the brightness (luminance) variation problem. While the reason for the occurrence of the problematic phenomenon is not fully clear, the following may be considered as a possible reason. A description will also be given of a possible reason why the above-described embodiment of the present invention can obscure the in-plane variation of luminance. The present invention, however, is not bound by the below-described theory.

As shown in FIGS. 13(a) through 13(c), the point-like light emitters 25 (e.g. light emitting diodes) of the light sources 24a, 24b, disposed opposite the light entrance surfaces 33, 34 of the light guide plate 30, each emit light radially. FIGS. 13(a) through 13(c) illustrate an exemplary case where light is emitted from a light emitting point 25a of each point-like light emitter 25 radially around the light guide direction. Light is emitted as a conically-spreading light flux LF from the light emitting point 25a, as shown by the dotted lines in FIGS. 13(a) through 13(c). FIGS. 13(a) through 13(c) show the same path of light as viewed in the front direction, in the second direction (the arrangement direction of the unit optical elements 50, 55) and in the first direction (the longitudinal direction of the unit optical elements 50, 55), respectively. For easy understanding, depiction of the first unit optical elements 50 and the second unit optical elements 55 is omitted from FIGS. 13(a) through 13(c).

Because light is emitted radially as shown in FIGS. 13(a) through 13(c), light L131 which can directly enter the light exit surface 31 of the light guide plate 30 (or the light exit-side surface 41 of the body portion 40 as illustrated in the Figures) just near the light entrance surface 33 or 34 of the light guide plate 30 (i.e. light from the light source 25a or 25b which, after entering the light guide plate 30, can directly enter the light exit surface 31 without being reflected at the back surface 32), little contains a light component along the second direction (i.e. the arrangement direction of the point-like light emitters 25), in other words, little travels in the second direction. On the other hand, of the light flux emitted radially from a point-like light emitter 25, light L133 which contains a considerably higher percentage of a component along the second direction, in other words, travels considerably more in the second direction, contains a lower percentage of a component along the first direction. Accordingly, the light L133 can directly enter the light exit surface 31 of the light guide plate 30 (or the light exit-side surface 41 of the body portion 40 as illustrated in the Figures) at a position P3 remote from the light entrance surface 33 or 34.

Thus, as shown in FIG. 13(a), light emitted radially from a point-like light emitter 25 can directly enter an area A1 (hereinafter also referred to as "bright area") which, when viewed in the front direction, is surrounded by a curve CL which is closest to the point-like light emitter 25 at a position P1 which faces the point-like light emitter 25 in the first direction. In particular, when light emitted by a point-like light emitter travels radially around the light guide direction (the first direction) as is common with a commercially available edge-light type surface light source device, the radial light flux LF can directly enter a bright area A1 which is surrounded by a parabola CL which is extremal at a position P1, the point closest to the point-like light emitter 25 in the first direction.

Accordingly, light which has been emitted by a point-like light emitter 25 that emits light radially and which has entered the light guide plate 30 will not directly reach, without reflection e.g. at the back surface, an area A2 (hereinafter also referred to as "dark area") of the light exit surface 31, which lies in the vicinity of the light entrance surface 33 or 34 of the light guide plate 30 and extends in the light guide direction (the first direction) and between adjacent bright areas A1. The amount of light exiting a dark area A2 is significantly lower than the amount of light exiting an adjacent bright area A1 that light which has been emitted by a point-like light emitter 25 that emits light radially and which has entered the light guide plate 30, can directly reach.

The above may be the reason why a pattern of alternating bright and dark portions is produced at the same pitch as the arrangement pitch of the point-like light emitters 25 along the arrangement direction of the point-like light emitters 25 in an area of the light exit surface 31, lying in the vicinity of the light entrance surface 33 or 34 that faces the light source consisting of the point-like light emitters 25.

When light which little contains a second-direction component (e.g. light L131 shown in FIGS. 13(a) through 13(c)) enters a light exit surface having a relatively large light exit surface angle, in particular a light exit surface angle of about 45° which can exert an excellent light condensing effect through refraction of light, the light repeats total reflection, such as retroreflection, and comes to travel toward the back surface (see light L52 shown in FIG. 5). Thus, as with the path of light L52, shown in FIG. 5, the light L131 travels in the first direction without a significant change in the second-direction component. Therefore, the light L131 which has entered a bright area A1 will not diffuse in the second direction. The traveling of the light L131, which has entered the bright area A1, toward an adjacent dark area A2 is thus restricted.

Even light that travels in a direction slightly inclined from the first direction (light guide direction) (e.g. light L132 shown in FIGS. 13(a) through 13(c)) is likewise prevented from traveling in the second direction by reflection at a light exit surface having a light exit surface angle of about 45°. This is considered as the reason why the in-plane variation of luminance along the arrangement direction of point-like emitters (the second direction) is produced in a wider area when a light guide plate is used which has unit prisms having a relatively large light exit surface angle for the purpose of condensing light.

It is expected that as the emission intensity of LED increases in the future, a decreased number of LEDs will be arranged at a larger spacing in a light source in order to reduce the cost of a display device. It is, therefore, likely that the above-described in-plane variation of luminance will be observed more clearly in a wider area in the vicinity of a light source.

According to this embodiment, on the other hand, the width Wa of each first unit optical element 50 gradually decreases from that at the center position Pc on the one-side surface 41 of the body portion 40 to that at each light entrance surface-side end position Pe, and is narrowest at each end position Pe. Because of the change in the width Wa of each first unit optical element 50, the area of the second unit optical elements 55 on the one-side surface 41 of the body portion 40 is largest at each light entrance surface-side end position Pe, and gradually decreases with distance from the light source 24a or 24b in the first direction. It has been found in the present inventors' studies that the second unit optical elements 55 having a relatively low height-to-width ratio (Ha/Wa) in the range of 0.05 to 0.3, or the gently inclined surfaces 37a, 38a having a relatively small light exit surface angle θa of more than 10° and not more than 30°, can effectively diffuse in the second direction lights L71, L72 as shown in FIG. 7, which are contained in a light flux that has been emitted by a point-like emitter 25 and entered the light guide plate 30 through the light entrance surface 33, have little second-direction component and a high percentage of a component along a direction parallel to the front direction nd, and directly enter the light exit surface 31 in the close vicinity of the light entrance surface 33. The light guide plate 30 of this embodiment thus can obscure variation of brightness in an area of the light exit surface 31, lying in the vicinity of the light entrance surface 33 or 34.

Further, in this embodiment the ratio of the height Ha to the width Wa (Ha/Wa) in the main cross-section of each first unit optical element 50 decreases as the position of the main cross-section in the first direction moves from the center position Pc toward the light source 24a, 24b. The cross-sectional shape of each first unit optical element 50 in the main cross-section at each light entrance surface-side end position Pe is identical to the cross-sectional shape of each second unit optical element 55 in the main cross-section. Thus, the light exit surface 31 of the light guide plate 30, in a position adjacent to the light entrance surface 33 or 34, consists solely of the gently inclined surfaces 37a, 38a having a relatively small light exit surface angle θa of more than 10° and not more than 30°. According to this embodiment, therefore, light having little second-direction component, which would produces a bright area A1 in a conventional light guide plate as described above, can be diffused very effectively in the second direction. This can very effectively obscure variation of brightness in an area of the light exit surface 31, lying in the vicinity of the light entrance surface 33 or 34.

As described above, the light guide plate 30 of this embodiment has, on the one-side surface 41 of the body portion 40, the first unit optical elements 50 having an excellent light extracting effect and an excellent light condensing effect, and the second unit optical elements 55 having an excellent light diffusing effect on light in the vicinity of a light source. When the light exit surface 31 is viewed in the normal direction nd of the one-side surface 41 of the body portion 40, the proportion of the area occupied by the first unit optical elements 50 in the light exit surface 31 is larger in a central area Ac, containing the center Pc on the one-side surface 41 and extending between both ends of the one-side surface 41 in the second direction perpendicular to the first direction, than in each end area Ae containing the light entrance surface-side end Pe on the one-side surface 41 and extending between both ends of the one-side surface 41 in the second direction. Further, when the light exit surface 31 is viewed in the normal direction nd of the one-side surface 41 of the body portion 40, the proportion of the area occupied by the second unit optical elements 55 in the light exit surface 31 is larger in each end area Ae than in the central area Ac.

The light guide plate 30 of this embodiment can therefore prevent a too large amount of light from exiting each end area Ae of the light exit surface 31, lying in the vicinity of the light source 24a or 24b. This makes it possible to ensure a sufficient amount of light exiting the central area Ac, containing the center Pc, of the light exit surface 31. Therefore, an image can be displayed brightly in the center of the display surface 11 of the display device 10. It thus becomes possible to equalize the distribution of the amount of light, exiting the light exit surface 31 of the light guide plate 30, along the first direction and, in addition, to effectively increase the brightness of an image, perceived by a viewer, by efficiently using light emitted by the light sources 24a, 24b.

Furthermore, light can be diffused to some extent in the second direction in each end area Ae of the light exit surface 31, lying in the vicinity of the light source 24a or 24b, and thereafter the traveling of the light in the second direction is restricted. This can equalize the distribution of the amount of light, exiting the light exit surface 31, along the second direction at varying positions in the first direction. The above-described optical action of the light guide plate 30 of this embodiment can effectively obscure the variation of brightness in the second direction, produced due to the arrangement of the point-like light emitters (LEDs) 25 of the light sources 24a, 24b, even when the point-like light emitters 25 are arranged at a large spacing for the purpose of energy saving.

Various changes and modifications may be made to the above-described embodiment. Some variations will now be described with reference to the drawings. In the drawings referred to in the following description, the same reference numerals are used for the same members or elements as used in the above-described embodiment, and a duplicate description thereof will be omitted.

Figure 18:
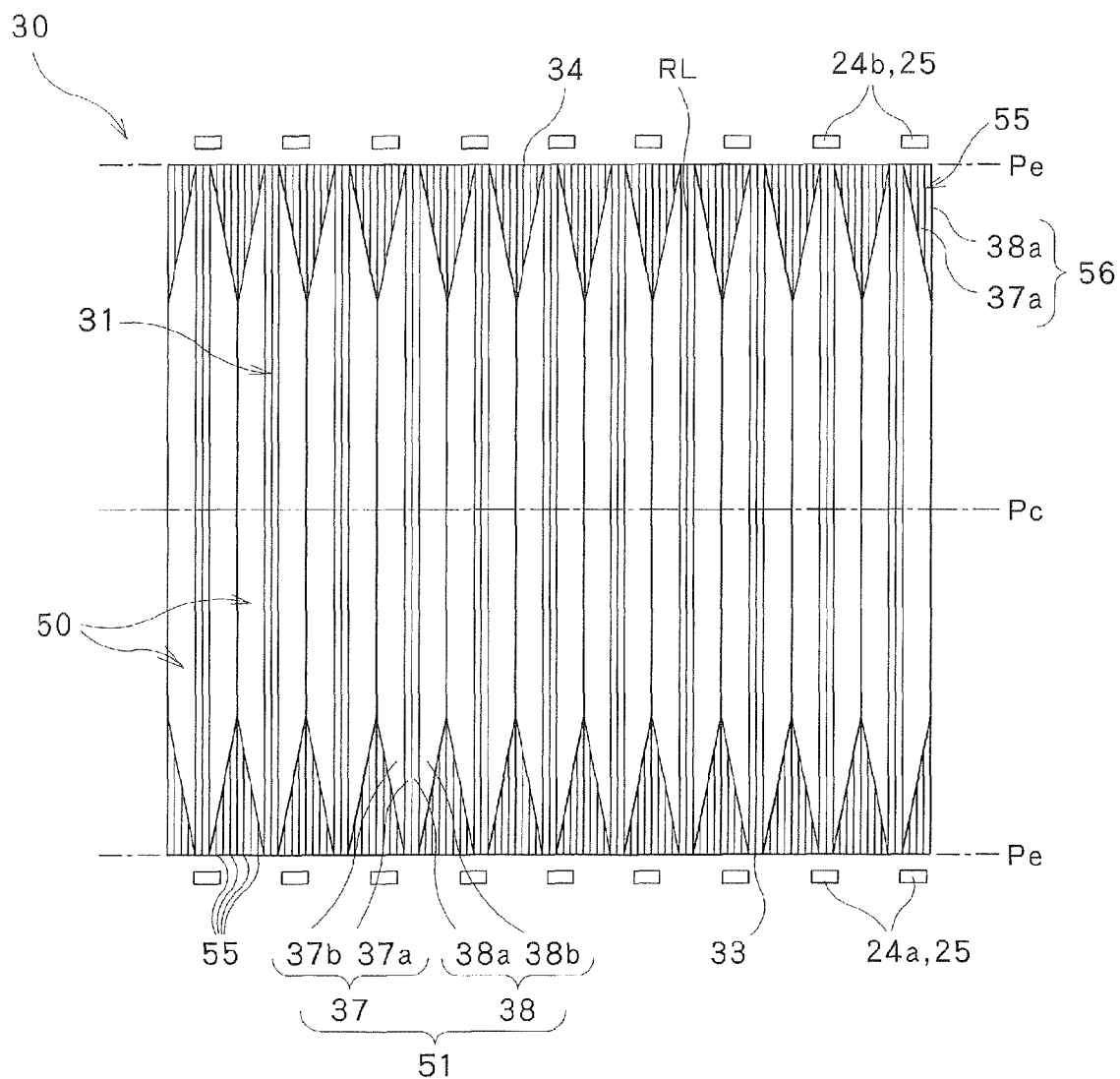
FIG. 18 is a plan view corresponding to FIG. 4, showing a variation of the light guide plate, as viewed from the side of the light exit surface.

Though in the above-described embodiment the cross-sectional shape of each first unit optical element 50 changes gradually along the first direction in the entire area from the center position Pc to each light entrance surface 33, 34-side end position Pe, it is also possible to design the first unit optical elements 50 to have a constant cross-sectional shape in a certain area containing the center position Pc in the first direction, as shown in FIG. 18. FIG. 18 is a diagram corresponding to FIG. 4, showing a variation of the light guide plate in the front direction nd.

In the above-described embodiment the rate of change in the cross-sectional shape of each first unit optical element 50 changes, so that in a front view, the first unit optical elements 50 each have a curved contour. However, as shown in FIG. 18, the rate of change in the cross-sectional shape of each first unit optical element 50 may be made constant, so that in a front view, the first unit optical elements 50 each have a linear contour. It is also possible to design the first unit optical elements 50 in such a way that the rate of change in the cross-sectional shape of each first unit optical element 50 is constant in a section and changes in another section.

Figure 19:
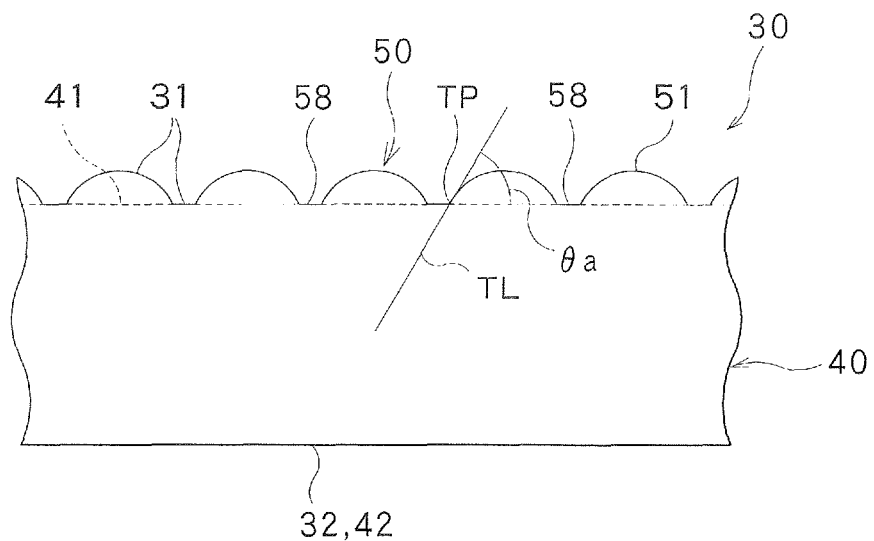
FIG. 19 is a diagram corresponding to FIG. 5, showing another variation of the light guide plate in the main cross-section.
Figure 20:
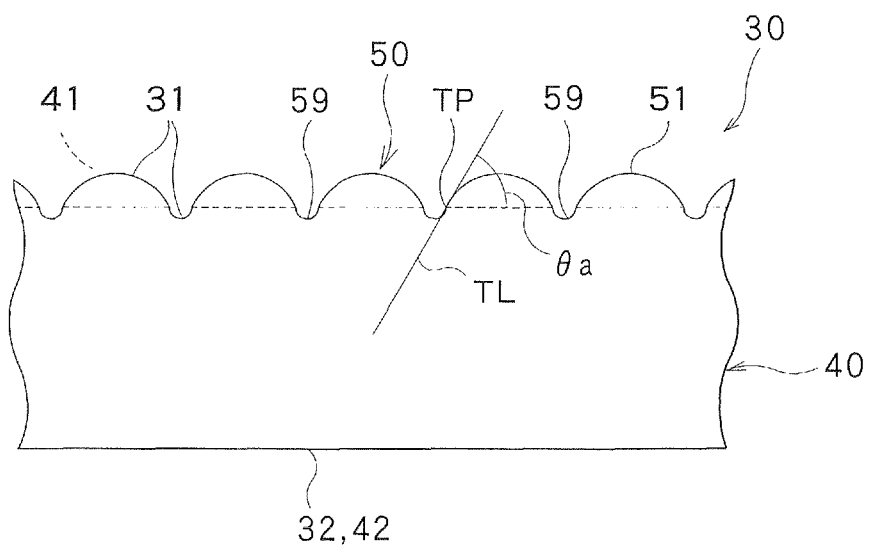
FIG. 20 is a diagram corresponding to FIG. 5, showing yet another variation of the light guide plate in the main cross-section.

The above-described construction of the first unit optical elements 50 and the second unit optical elements 55 is merely an example. In another example, at least one of the contour 51 of each first unit optical element 50 and the counter 56 of each second unit optical element 55 in the main cross-section of the light guide plate may contain a curved line(s). As described previously, when the cross-sectional shape of each unit optical element 50 or 60 in the main cross-section of the light guide plate contains a curved line, the light exit surface angle θa refers to the angle formed between a tangent TL to the contour 51 or 56 of a unit optical element 50 or 55 and the one-side surface 41 of the body portion 40, more precisely the smaller one (minor angle) of the two angles formed, as shown in FIGS. 19 and 20. FIGS. 19 and 20 are diagrams corresponding to FIG. 5, each showing a variation of the light guide plate in the main cross-section at the center position Pc.

Though in the above-described embodiment the unit optical elements 50, 55 are arranged without any space between two adjacent unit optical elements, it is possible to provide a flat portion 58 between two adjacent unit optical elements, as shown in FIG. 19, or to provide a recessed portion 59 between two adjacent unit optical elements, as shown in FIG. 20.

Though in the above-described embodiment the unit optical elements 50, arranged side by side in the arrangement direction, all have the same cross-sectional shape at any position in the light guide direction, it is possible to design the first unit optical elements 50 in such a way that in a front view, the position of that portion (point or area) of a first unit optical element 50 along the first direction at which the width of the first unit optical element 50 is largest differs between at least two of the first unit optical elements 50.

Figure 21:
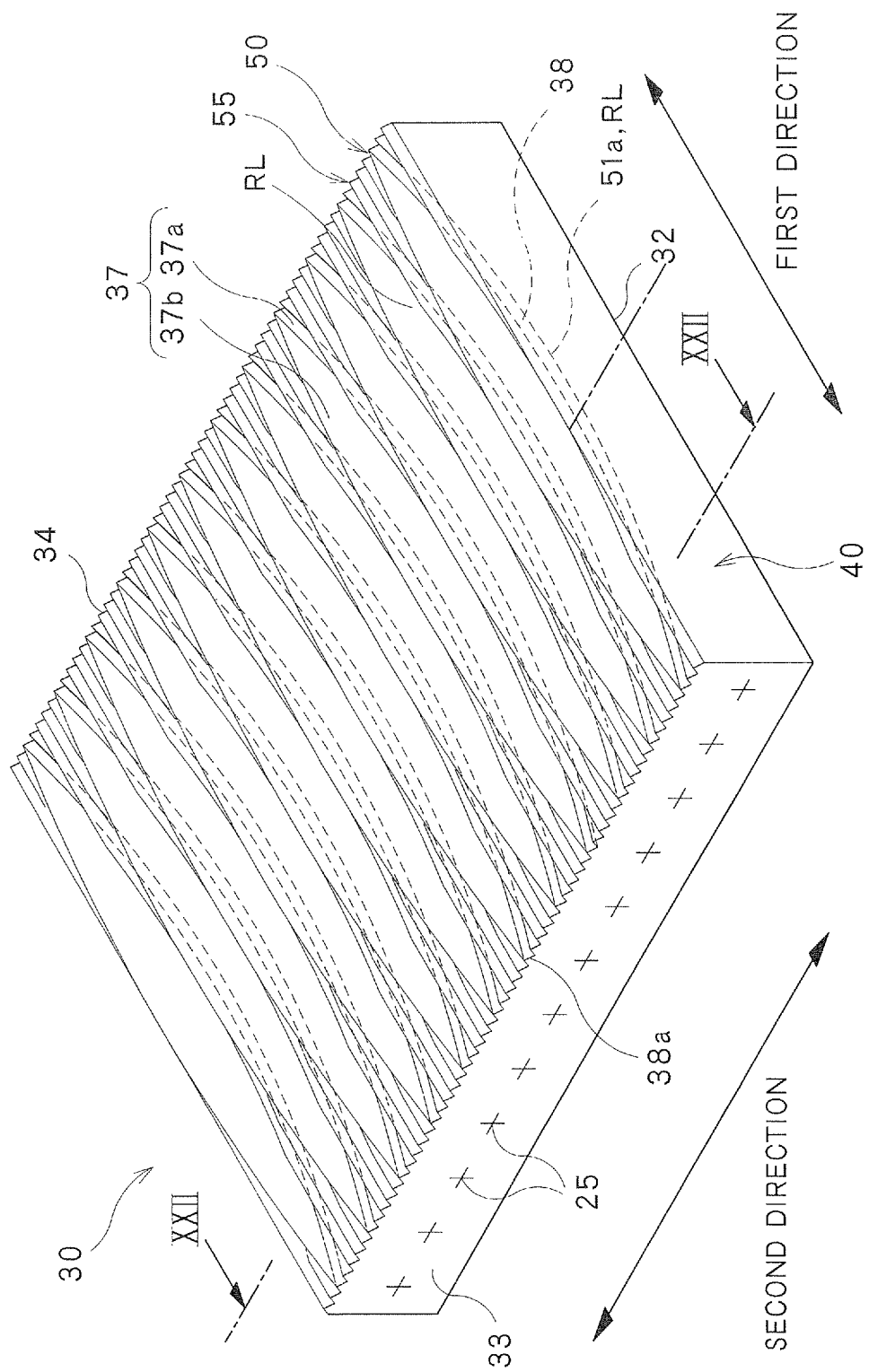
FIG. 21 is a diagram corresponding to FIG. 3, showing yet another variation of the light guide plate in the main cross-section.
Figure 22:
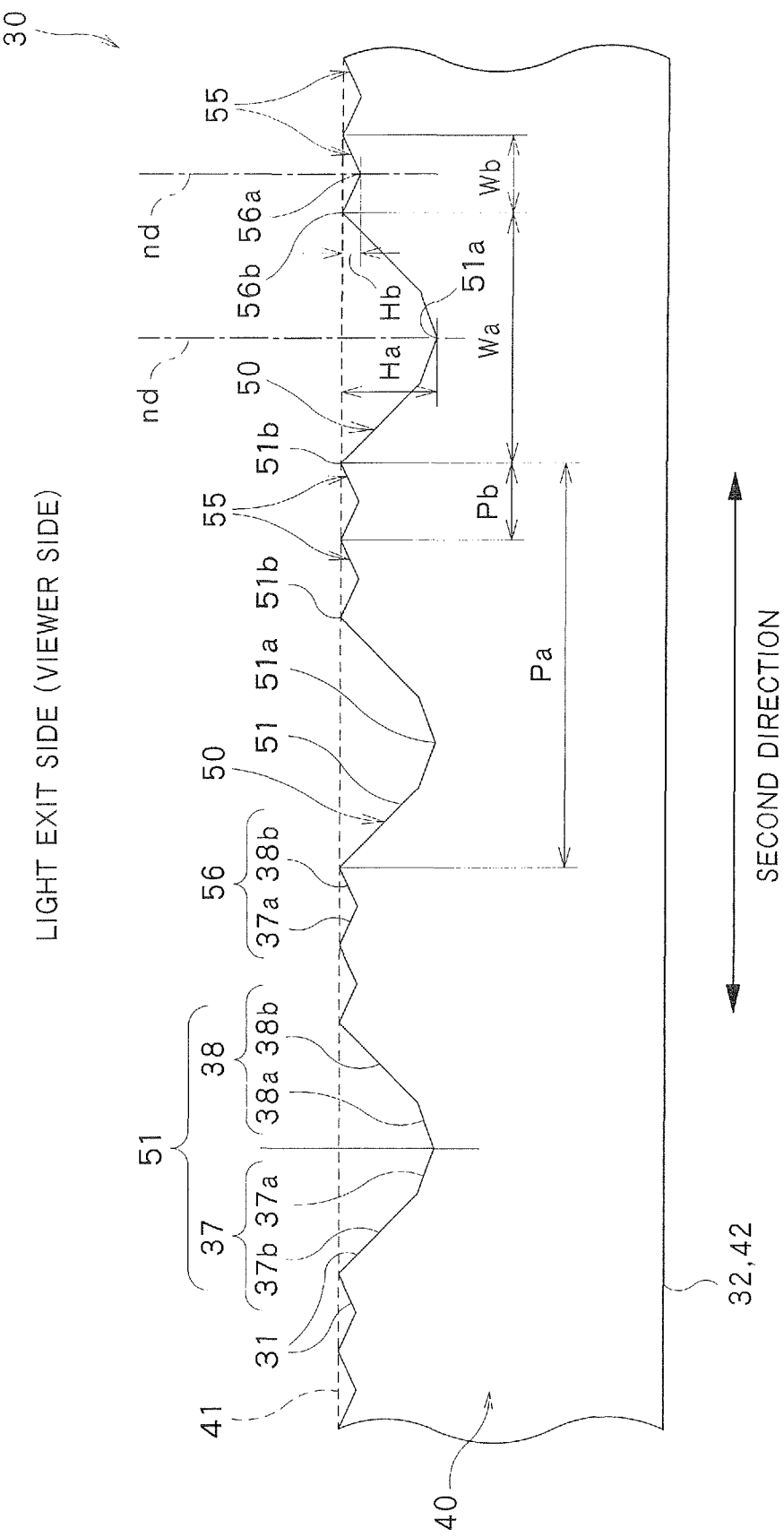
FIG. 22 is a diagram corresponding to FIG. 6, showing the cross-section along the line XXII-XXII of FIG. 21.

In the above-described embodiment, the light exit surface 31 of the light guide plate 30 consists of the inclined surfaces 37a, 37b, 38a, 38b which are inclined with respect to the plate plane of the light guide plate 30 and provided by the first unit optical elements 50 and the second unit optical elements 55 formed on the one-side surface 41 of the body portion 40. However, as shown in FIGS. 21 and 22, it is also possible to provide a light guide plate 30 with inclined surfaces 37a, 37b, 38a, 38b by forming first grooves and second grooves, having the shapes of the inverted first unit optical elements 50 and the inverted second unit optical elements 55, respectively, in the one-side surface 41 of the body portion 40. Thus, in this embodiment, the grooves serve as unit optical elements which exert an optical effect on light.

More specifically, the light guide plate 30 consists of the body portion 40 having first unit optical elements (first grooves) 50 comprised of grooves formed in the one-side surface 41 of the body portion 40 and arranged side by side in an arrangement direction intersecting the first direction, each groove extending in a direction intersecting the arrangement direction, and second unit optical elements (second grooves) 55 comprised of grooves formed in between the first unit optical elements (first grooves) 50 in the one-side surface 41 of the body portion 40. The light guide plate 30 can be produced by shaping using a mold with a three-dimensional pattern, having the same configuration as the light exit surface 31 of the above-described light guide plate 30, formed in the mold surface. The above-described construction of the first unit optical elements 50 of the preceding embodiment can be applied in an inverted manner to the first grooves of this embodiment as first unit optical elements 50. Similarly, the above-described construction of the second unit optical elements 55 of the preceding embodiment can be applied in an inverted manner to the second grooves of this embodiment as second unit optical elements 55. The inclined surfaces 37a, 37b, 38a, 38b, defined by the first unit optical elements (first grooves) 50 and the second unit optical elements (second grooves) 55, can exert the same optical effects as those described above with reference to the preceding embodiment.

In the embodiment shown in FIGS. 21 and 22, the groove-shaped first unit optical elements 50 are shaped complementarily to the above-described generally columnar first unit optical elements, and the groove-shaped second unit optical elements 55 are shaped complementarily to the above-described generally columnar second unit optical elements. In FIGS. 21 and 22, the same reference numerals are used for parts or portions corresponding to those of the above-described embodiment.

As shown in FIGS. 21 and 22, when the light exit surface 31 is viewed in the normal direction nd of the one-side surface 41 of the body portion 40, the proportion of the area occupied by the first unit optical elements (first grooves) 50 in the light exit surface 31 is larger in a central area Ac, containing the center Pc between the light entrance surface 34 and the counter surface 34 on the one-side surface 41 and extending between both ends of the one-side surface 41 in the second direction perpendicular to the first direction, than in each end area Ae containing the light entrance surface-side end Pe on the one-side surface 41 and extending between both ends of the one-side surface 41 in the second direction. Further, when the light exit surface 31 is viewed in the normal direction nd of the one-side surface 41 of the body portion 40, the proportion of the area occupied by the second unit optical elements (second grooves) 55 in the light exit surface 31 is smaller in the central area Ac than in each end area Ae. The width Wa of each first unit optical element (first groove) 50 in the arrangement direction increases with distance from each light entrance surface-side end Pe in at least one section of the area from the light entrance surface-side end Pe on the one-side surface 41 to the center Pc between the light entrance surface 33 and the counter surface 34 on the one-side surface 41. On the other hand, the width Wb of each second unit optical element (second groove) 55 in the arrangement direction of the second unit optical elements 55 is constant in that area of the second unit optical element 55 which is not in contact with a first unit optical element 50.

In addition, the ratio of the height (depth) Ha of each first unit optical element (first groove) 50 to the width Wa of the first unit optical element (first groove) 50 in the arrangement direction of the first unit optical elements 50, at the center Pc on the one-side surface 41, is higher than the ratio of the height (depth) Hb of each second unit optical element (second groove) 55 to the width Wb of the second unit optical element (second groove) 55 in the arrangement direction of the second unit optical elements 55 at each light entrance surface-side end Pe on the one-side surface 41. Furthermore, the angle of the light exit-side surface 51 of each first unit optical element (first groove) 50 with respect to the one-side surface 41 of the body portion 40 at the base end 51b of the light exit-side surface 51, the closest portion to the one-side surface 41 of the body portion 40, in a cross-section parallel to both the normal direction nd of the one-side surface 41 of the body portion 40 and the arrangement direction of the first unit optical elements (first grooves) 50, and containing the center Pc on the one-side surface 41, is larger than the angle of the light exit-side surface 56 of each second unit optical element (second groove) 55 with respect to the one-side surface 41 of the body portion 40 at the base end 56b of the light exit-side surface 56, the closest portion to the one-side surface 41 of the body portion 40, in a cross-section or end surface parallel to both the normal direction nd of the one-side surface 41 of the body portion 40 and the arrangement direction of the first unit optical elements (first grooves) 50, and containing the light entrance surface-side end Pe on the one-side surface 41. Further, in the cross-sectional shape of each first unit optical element (first groove) 50 in the main cross-section parallel to both the normal direction nd of the one-side surface 41 of the body portion 40 and the arrangement direction of the first unit optical elements (first grooves) 50, and containing the center Pc on the one-side surface 41, the shape of an area containing the apex (deepest point) 51a, the farthest point from the one-side surface 41 of the body portion 40, is identical to the cross-sectional shape of each second unit optical element (second groove) 55 in the main cross-section parallel to both the normal direction nd of the one-side surface 41 of the body portion 40 and the arrangement direction of the first unit optical elements (first grooves) 50.

In the embodiment shown in FIGS. 21 and 22, the groove-shaped first unit optical elements 50 and the groove-shaped second unit optical elements 55 are formed, with no space between adjacent unit optical elements, in the one-side surface 41 of the body portion 40. Thus, in the illustrated embodiment, the one-side surface 41 of the body portion 40 is a virtual surface defined by the base ends 51b, 56b of the first and second unit optical elements 50, 55.

Figure 23:
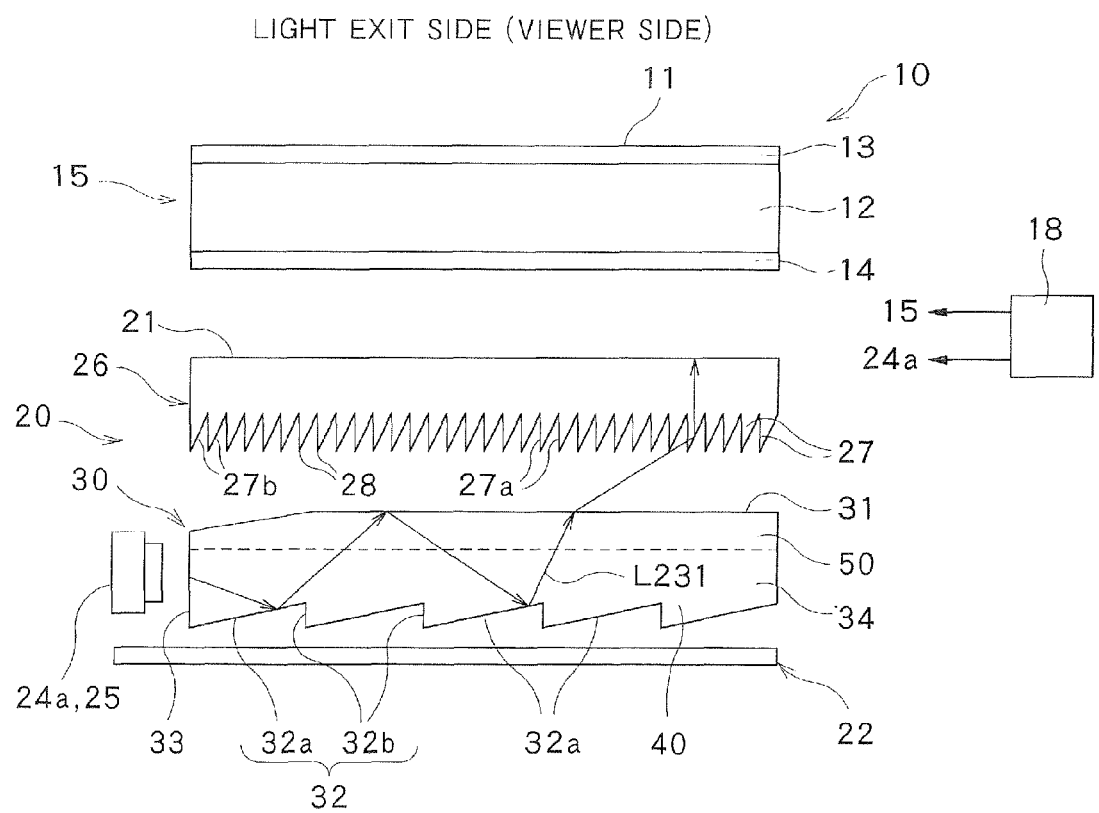
FIG. 23 is a cross-sectional view corresponding to FIG. 1, showing a variation of the surface light source device.

Though in the above-described embodiment the two opposing side surfaces 33, 34 of the light guide plate 30 serve as the light entrance surfaces, it is possible to design the surface light source device in such a way that only one side surface 33 of the light guide plate 30 serves as a light entrance surface as in the variation shown in FIG. 23. According to this variation, in a cross-section parallel to both the first direction and the normal direction nd of the light emitting surface 21 of the surface light source device 20, light exits the light guide plate 30 in a direction inclined from the front direction nd toward the light guide direction. Therefore, the unit prisms 27 of the optical sheet 26 need not have a symmetrical shape in a cross-section parallel to both the first direction and the normal direction nd of the light emitting surface 21 of the surface light source device 20. In the variation shown in FIG. 23, each unit prism 27 has a transmissive surface 27a which transmits light from the light guide plate 30, and a reflective surface 27b which totally reflects light that has entered the optical sheet 26 through the transmissive surface 27a. The reflective surface 27b is inclined with respect to the front direction nd, whereas the transmissive surface 27a extends approximately parallel to the front direction nd.

With the two light entrance surfaces 33, 34 provided at a distance from each other in the first direction in the above-described embodiment, the light exit surface 31 of the light guide plate 30 is constructed symmetrically with respect to the center position Pc in the first direction. However, in the case where the light guide plate 30 has only one light entrance surface 33, the light exit surface 31 of the light guide plate 30 may be constructed asymmetrically.

Figure 24:
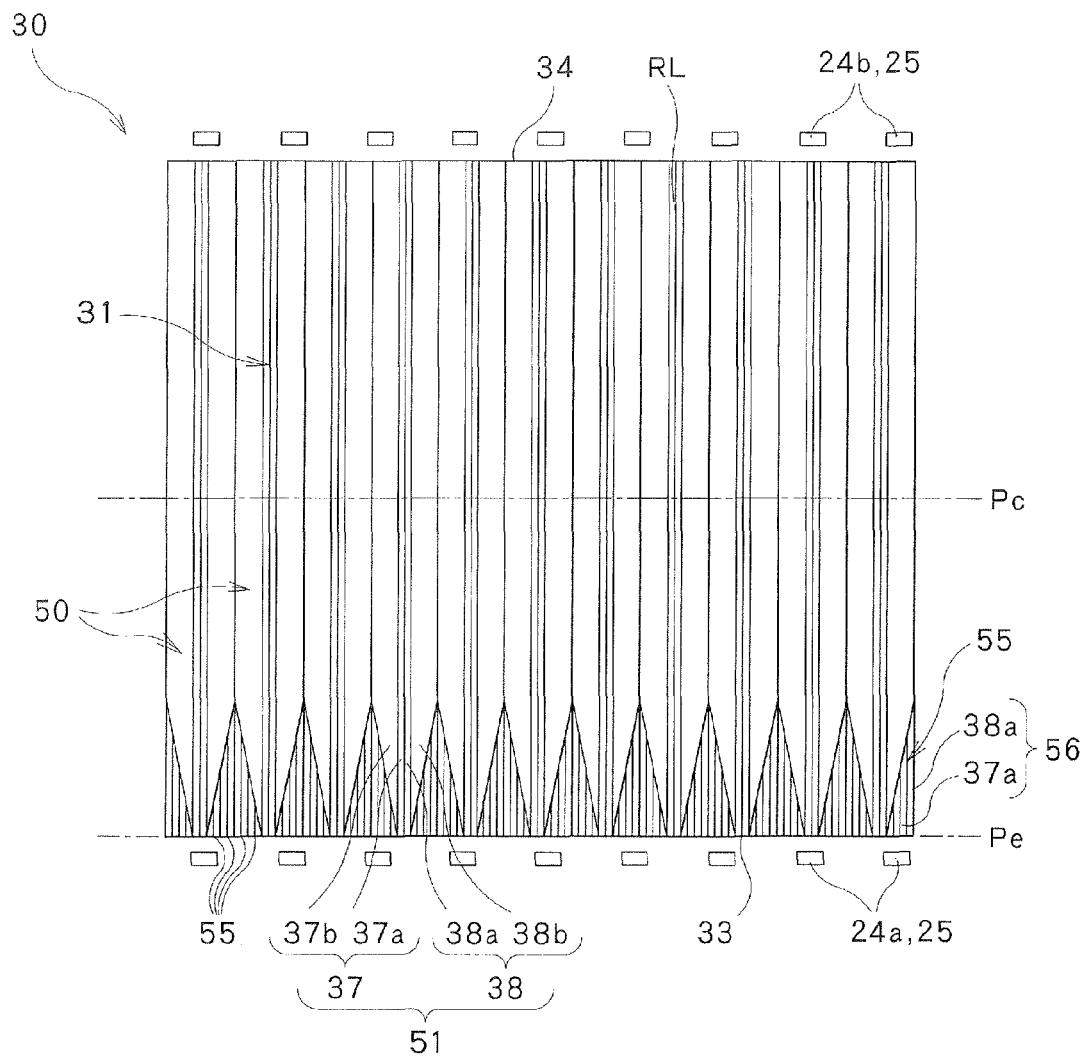
FIG. 24 is a plan view corresponding to FIG. 4, showing the light guide plate incorporated into the surface light source device of FIG. 1, as viewed from the side of the light exit surface.

FIG. 24 shows an exemplary light guide plate 30 suited for incorporation into the surface light source device 20 (display device 10) of FIG. 23. The light guide plate 30 shown in FIG. 24 differs from the light guide plate described above with reference to FIG. 18 in that there is no change in the cross-sectional shape of each unit optical element 50 in the vicinity of the counter surface 34 opposed to the sole light entrance surface 33.

Though in the above-described embodiment the diffusing component 45 is dispersed in the body portion 40 so that light that has entered the light guide plate 30 can exit the light guide plate 30, some other method may be used to cause light to exit the light guide plate 30.

For example, it is possible to incline the light exit surface 31 and the back surface 32 of the light guide plate 30 with respect to each other as shown in FIG. 23. In the embodiment shown in FIG. 23, the back surface 32 consists of a plurality of inclined surfaces 32a, and step surfaces 32b each connecting two adjacent inclined surfaces 32a. Each inclined surface 32a is inclined such that the distance to the light exit surface 31 decreases with distance from the light entrance surface 33. Each step surface 32b extends in the normal direction nd of the plate plane of the light guide plate 30. Therefore, most of light, traveling in the light guide plate 30 from the light entrance surface 33 toward the counter surface 34, reflects at an inclined surface(s) 32a without entering a step surface 32b. As shown in FIG. 23, when light L231 travels in the light guide plate 30 while reflecting at the light exit surface 31 and at the back surface 32, the incident angle of the light L231 at the light exit surface 31 or the back surface 32 decreases after every reflection of the light, and eventually becomes less than the critical angle for total reflection. Accordingly, despite the absence of a light diffusing component in the body portion 40, the light L231 traveling in the light guide plate 30 can exit the light guide plate 30 at a position at a distance from the light entrance surface 33. The amount of light exiting the light guide plate 30 can thus be made uniform along the first direction.

Instead of or in addition to the above-described method(s) to cause light to exit the light guide plate 30, i.e. the method of dispersing the diffusing component 45 in the body portion 40 and/or the method of inclining the light exit surface 31 and the back surface 32 with respect to each other, it is possible to use some other method to extract light from the light guide plate 30. Examples may include a method of roughening at least one of the light exit surface 31 and the back surface 32, a method of providing a pattern of while scattering layer on the back surface 32, etc. Though in the above-described embodiment the back surface 32 of the light guide plate 30 consists of the inclined surfaces 32a and the step surfaces 32b, it is possible to eliminate the step surfaces 32b, and to construct the back surface 32 as a continuous flat inclined surface or as a continuous curved surface.

In the above-described embodiment the light sources 24a, 24b are comprised of the plurality of point-like light emitters (LEDs) 25 arranged side by side in the longitudinal direction of the light entrance surfaces 33, 34 of the light guide plate 30. However, various other types of light emitters usable in an edge-light type surface light source device, for example, cold-cathode fluorescent lamps extending parallel to the longitudinal direction of the light entrance surfaces 33, 34 of the light guide plate 30, may be used for the light sources 24a, 24b.

The above-described optical sheet 26, disposed on the light exit side of the light guide plate 30, is merely an example. It is possible to use various other types of optical sheets instead of the above-described optical sheet 26. For example, it is possible to use an optical sheet having unit prisms 27 on the light exit side. It is also possible to use an optical sheet having unit prisms 27, each having a cross-sectional shape other than a triangle, for example, a polygon other than a triangle, a part of an ellipse, etc.

The above-described constructions of the surface light source device 20 and the display device 10 are merely examples and are capable of various modifications. For example, a light diffusion sheet which has a function to diffuse transmitted light, a polarization separation film which has a function to transmit only a particular polarization component and reflect the other polarization component, etc. may be provided on the light exit side of the optical sheet 26.

In the above-described embodiment the reflective sheet 22 is provided opposite the back surface 32 of the light guide plate 30 so that light which has exited the back surface 32 of the light guide plate 30 is returned to the light guide plate 30. However, it is possible to design the light guide plate 30 in such a way that the light exit surface 31 functions as a first light exit surface and the back surface 32 functions as a second light exit surface. Thus, it is possible to design a double-sided light-emitting surface light source device. For example, a double-sided display device can be constructed by providing components disposed on the side of the light exit surface 31 of the light guide plate 30, such as the optical sheet 26 and the liquid crystal display panel 15, also on the side of the back surface 32 of the light guide plate 30. In this case, the back surface 32 of the light guide plate 30 may have the same construction as the above-described light exit surface 31. Such a display device can simultaneously display images which may be the same or different.

The modifications described hereinabove may also be made in an appropriate combination to the above-described embodiments.

EXAMPLES

The following examples illustrate the present invention in greater detail and are not intended to limit the invention in any manner.

<Surface Light Source Device>

Surface light source devices (samples A to C) were prepared. Each surface light source consisted of a light guide plate, a light source, a reflective sheet and an optical sheet which were arranged in the same positional relationship as in the above-described embodiment. The surface light source devices of samples A to C were the same in the light source, the reflective sheet and the optical sheet, but differed from one another in the construction of the unit optical elements of the light guide plate as described below.

(Light Guide Plate)

The light guide plate used consisted of a body portion and unit optical elements arranged on a one-side surface of the body portion. As in the above-described embodiment, a pair of opposing side surfaces of the light guide plate served as light entrance surfaces. Thus, the below-described light sources were disposed opposite the pair of side surfaces.

The unit optical elements were produced by curing a UV-curable acrylic resin on the one-side surface of the body portion. Simultaneously with the production of the unit optical elements, a land portion having a constant thickness was formed between the unit optical elements and a substrate, constituting the body portion, by curing the same UV-curable acrylic resin as the unit optical elements. The body portion thus consisted of the land portion and a plate-like material which had served as the substrate upon the shaping of the unit optical elements. The body portion had a flat plate-like shape having a constant thickness, with the light exit surface and the back surface parallel to each other. The plate-like material as the substrate was made of polymethyl methacrylate (PMMA) containing a light scattering agent as a diffusing component. As described above, the construction of the unit optical elements differed between the surface light source devices of samples A to C.

Figure 25:
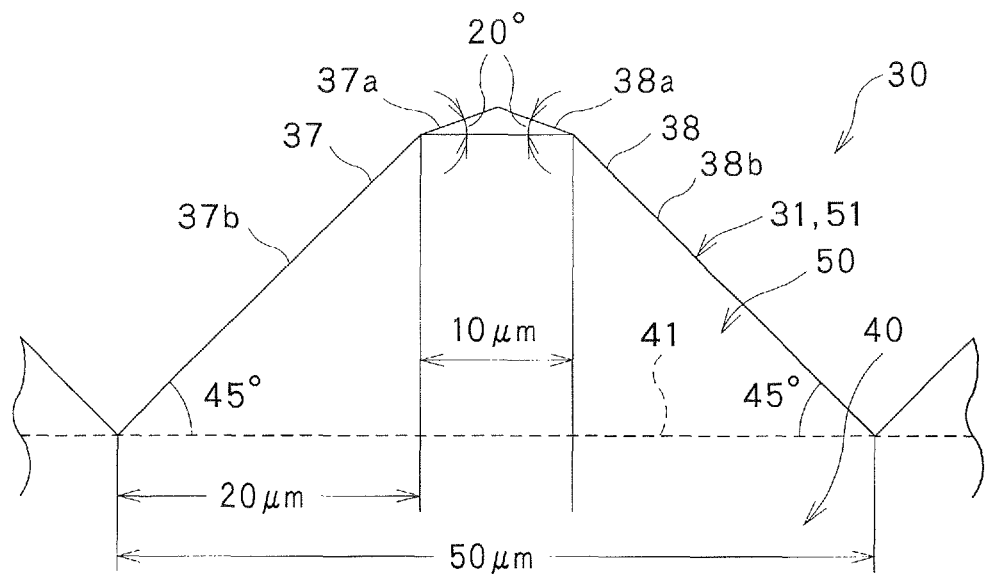
FIG. 25 is a diagram showing the cross-sectional shape of a unit optical element in the main cross-section of the light guide plate of sample A.
Figure 26:
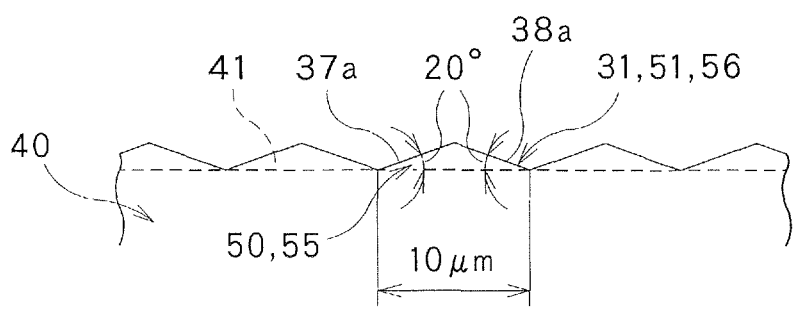
FIG. 26 is a diagram showing the cross-sectional shape of a unit optical element in the main cross-section of the light guide plate of sample B.

In the surface light source device of sample A, as in the above-described embodiment, first unit optical elements and second unit optical elements were produced on the one-side surface of the body portion. The first unit optical elements and the second unit optical elements were constructed and arranged in the same manner as in the above-described embodiment. Thus, the first unit optical elements, at the center position Pc, were arranged with no space therebetween in the arrangement direction (second direction). As shown in FIGS. 3 and 4, the height and the width of each first unit optical element gradually decreased from those at the center position Pc to those at each end position Pe in the light guide direction (first direction). The cross-sectional shape of each first unit optical element was made the same as in the above-describe embodiment (see FIGS. 5 through 7). As shown in FIGS. 3 and 4, each second unit optical element had a constant cross-sectional shape along the first direction in that area of the second unit optical element which was not in contact with a first unit optical element. Each first unit optical elements and each second unit optical elements had the same cross-sectional shape at each end position Pe. FIG. 25 shows the shape and the dimensions of each first unit optical element in the main cross-section at the center position Pc. FIG. 26 shows the shape and the dimensions of each first unit optical element in the main cross-section (end surface) at each end position Pe. The shape and the dimensions shown in FIG. 26 also applied to the cross-sectional shape and the dimensions of each second unit optical element in the main cross-section.

The light guide plate of the surface light source device of sample B differed from the light guide plate of the surface light source device of sample A in the absence of the second unit optical elements, and was otherwise the same. Thus, in the surface light source device of sample B, the light guide plate consisted of the body portion and first unit optical elements provided on the one-side surface of the body portion. The first unit optical elements had the same construction (FIGS. 25 and 26) as the first unit optical elements included in the light guide plate of the surface light source device of sample A.

Figure 27:
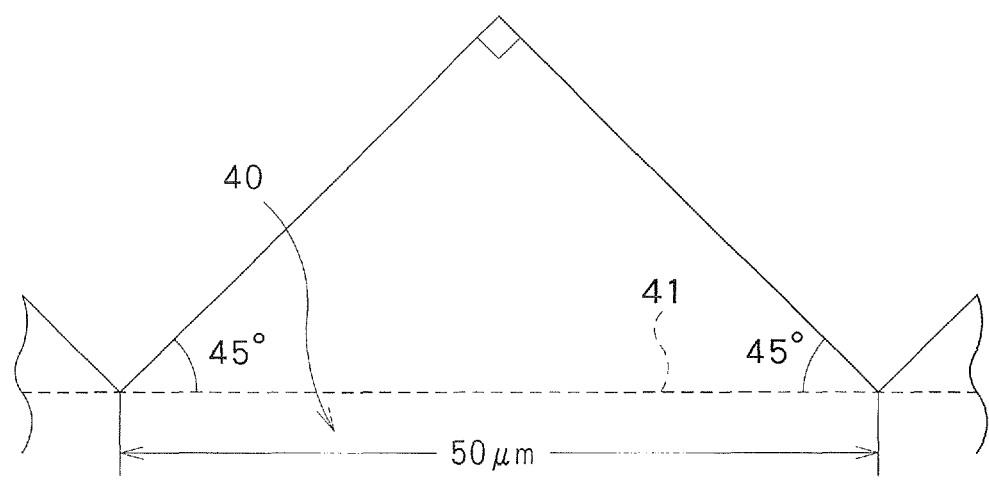
FIG. 27 is a diagram showing the cross-sectional shape of a unit optical element in the main cross-section of the light guide plate of sample C.

The light guide plate of the surface light source device of sample C consisted of the body portion and prisms provided on the one-side surface of the body portion. The prisms were arranged, with no space therebetween, in the second direction on the one-side surface of the body portion. Each prism extends linearly in the first direction. FIG. 27 shows the cross-sectional shape and the dimensions of each prism in the main cross-section. FIGS. 25 through 27 use the same reference numerals as those of the above-described FIGS. 1 through 24.

(Light Source)

A light source was constructed by arranging a large number of IED chips, each having a size of 1.6 mm×0.8 mm, at a pitch of 2.0 mm in the longitudinal direction of each light entrance surface (the above-described second direction) of the light guide plate such that the 0.8-mm side of each LED chip is parallel to the thickness direction of the light guide plate. The light source was disposed opposite each of the two opposing light entrance surfaces of the light guide plate. The two light sources were disposed such that a 0.8-mm gap was formed between each light source and the corresponding light entrance surface of the light guide plate.

(Reflective Sheet)

A white 250-μm thick polyester film as a reflective sheet was disposed opposite the back surface of the light guide plate.

(Optical Sheet)

A so-called prism sheet as an optical sheet was disposed opposite the light exit surface of the light guide plate. The optical sheet (prism sheet) consisted of a 125-μm thick polyester film, and unit prisms formed from a UV-curable acrylic resin. Each unit prism had an isosceles triangular shape with an apex angle of 65° at the top in a cross-section perpendicular to the longitudinal direction. As with the optical sheet of the above-described embodiment, the optical sheet was disposed such that the unit prisms project toward the light guide plate and that the arrangement direction of the unit prisms is parallel to the light guide direction of the light guide plate (the first direction).

<Evaluation Method>

Each surface light source device with the light sources lighting was observed visually at a distance of 1 m from the light emitting surface of the surface light source device to check whether variation of brightness, i.e. a pattern of alternating bright and dark portions, was observed in an area of the light emitting surface of the surface light source device, lying in the vicinity of each light entrance surface. The observation results are shown in Table 1. In Table 1, the symbol "B" in the row headed "visual determination" indicates a clear pattern of alternate bright and dark portions, "G" indicates a dull pattern of alternate bright and dark portions, and "VG" indicates no pattern of alternate bright and dark portions.

Furthermore, measurement of the front-direction luminance of the light emitting surface of each surface light source device was conducted at a center position in the first direction, using a luminance meter BM-7, manufactured by Topcon Corporation. The results of the measurement are shown in Table 1 in terms of the relative luminance (percentage) among the surface light source devices tested.

TABLE 1

Evaluation Results for the Samples

| | Samples | | |
|---|---|---|---|
| | A | B | C |
| Visual determination (variation of luminance) | VG | G | B |
| Luminance (%) | 100 | 100 | 80 |

The invention claimed is:

1. A light guide plate having a light exit surface, a back surface opposed to the light exit surface, at least one light entrance surface consisting of a part of a side surface between the light exit surface and the back surface, and a counter surface consisting of a part of the side surface and opposing the one light entrance surface in a first direction, said light guide plate comprising:

a body portion;

first unit optical elements arranged on a one-side surface of the body portion in an arrangement direction intersecting the first direction, each element extending in a direction intersecting the arrangement direction; and second unit optical elements disposed between first unit optical elements on the one-side surface of the body portion;

wherein when the light exit surface is viewed in a normal direction of the one-side surface of the body portion, a proportion of an area occupied by the first unit optical elements in the light exit surface is larger in a central area, the central area containing a center between the light entrance surface and the counter surface on the one-side surface of the body portion and extending between both ends of the one-side surface of the body portion in a second direction perpendicular to the first direction, than in an end area containing a light entrance surface-side end of the one-side surface of the body portion and extending between both ends of the one-side surface of the body portion in the second direction;

wherein when the light exit surface is viewed in the normal direction of the one-side surface of the body portion, a proportion of an area occupied by the second unit optical elements in the light exit surface is smaller in the central area than in the end area;

wherein a light exit surface angle of each first unit optical element, which is the angle of a light exit-side surface of the first unit optical element with respect to the one-side surface of the body portion in a main cross-section parallel to both the normal direction of the one-side surface of the body portion and the arrangement direction of the first unit optical elements, changes in at least one portion or region between an apex, the farthest point from the one-side surface of the body portion, and each base end, the closest portion to the one-side surface of the body portion, in the light exit-side surface of the first unit optical element such that the light exit surface angle solely increases from that at the apex to that at the base end; and wherein in a cross-sectional shape of each first unit optical element in a main cross-section parallel to both the normal direction of the one-side surface of the body portion and the arrangement direction of the first unit optical elements, and containing the center on the one-side surface, a shape of a part of each first unit optical element containing an apex, the farthest point from the one-side surface of the body portion, is identical to the cross-sectional shape of a whole of each second unit optical element in the main cross-section parallel to both the normal direction of the one-side surface of the body portion and the arrangement direction of the first unit optical elements.

2. The light guide plate according to claim 1, wherein a ratio of a height of each first unit optical element to a width of the first unit optical element in the arrangement direction, at the center on the one-side surface of the body portion, is higher than a ratio of a height of each second unit optical element to a width of the second unit optical element in the arrangement direction at the light entrance surface-side end on the one-side surface of the body portion.

3. The light guide plate according to claim 1, wherein an angle of a light exit-side surface of each first unit optical element with respect to the one-side surface of the body portion at a base end of the light exit-side surface, the closest portion to the one-side surface of the body portion, in a cross-section parallel to both the normal direction of the one-side surface of the body portion and the arrangement direction of the first unit optical elements, and containing the center on the one-side surface of the body portion, is larger than an angle of a light exit-side surface of each second unit optical element with respect to the one-side surface of the body portion at a base end of the light exit-side surface, the closest portion to the one-side surface of the body portion, in a cross-section or end surface parallel to both the normal direction of the one-side surface of the body portion and the arrangement direction of the first unit optical elements, and containing the light entrance surface-side end on the one-side surface of the body portion.

4. The light guide plate according to claim 1, wherein a light exit surface angle of each second unit optical element, which is the angle of a light exit-side surface of the second unit optical element with respect to the one-side surface of the body portion in the main cross-section parallel to both the normal direction of the one-side surface of the body portion and the arrangement direction of the first unit optical elements, is constant between an apex, the farthest point from the one-side surface of the body portion, and each base end, the closest portion to the one-side surface of the body portion, in the light exit-side surface of the second unit optical element, or changes in at least one portion or region between the apex and the base end in the light exit-side surface of the second unit optical element such that the light exit surface angle solely increases from that at the apex to that at the base end.

5. The light guide plate according to claim 1, wherein the first unit optical elements each extend on the one-side surface of the body portion from the light entrance surface-side end to a counter surface-side end.

6. The light guide plate according to claim 5, wherein a width of each first unit optical element in the arrangement direction at the center on the one-side surface of the body portion is larger than a width of the first unit optical element in the arrangement direction at the light entrance surface-side end on the one-side surface of the body portion.

7. The light guide plate according to claim 1, wherein the second unit optical elements are disposed in an area containing the light entrance surface-side end on the one-side surface of the body portion.

8. The light guide plate according to claim 1, wherein the second unit optical elements are arranged in the arrangement direction of the first unit optical element; and wherein the first unit optical elements and the second unit optical elements each extend linearly parallel to each other.

9. The light guide plate according to claim 8, wherein an arrangement pitch of the first unit optical elements in the arrangement direction is equal to an integral multiple of an arrangement pitch of at least two second unit optical elements disposed between two adjacent first unit optical elements.

10. The light guide plate according to claim 9, wherein a cross-sectional shape of each second unit optical element in a main cross-section parallel to both the normal direction of the one-side surface of the body portion and the arrangement direction of the first unit optical elements, is constant along a longitudinal direction of the second unit optical element in that area of the second unit optical element which is not in contact with a first unit optical element on the one-side surface of the body portion.

11. The light guide plate according to claim 1, wherein the first unit optical elements are arranged, with no space therebetween, in the arrangement direction at the center on the one-side surface of the body portion.

12. The light guide plate according to claim 1,
wherein a cross-sectional shape of each first unit optical element in a cross-section parallel to both the normal direction of the one-side surface of the body portion and the arrangement direction of the first unit optical elements, and containing the center on the one-side surface of the body portion, is a pentagonal shape which includes two sides lie between the apex, the farthest point from the one-side surface of the body portion, of the light exit-side surface and each base end, the closest portion to the one-side surface of the body portion, of the light exit-side surface, or a shape in which one or more of the corners of the polygonal shape are chamfered; and
wherein of the two sides lying between the apex and each base end of the light exit-side surface, the light exit surface angle of an apex-side side is more than 10° and not more than 30°, or the light exit surface angle of a base end-side side is more than 30° and not more than 60°.

13. A surface light source device comprising:
the light guide plate according to claim 1; and
a light source disposed so as to face the light entrance surface of the light guide plate.

14. A display device comprising:
the surface light source device according to claim 13; and
a liquid crystal display panel disposed so as to face the surface light source device.

15. The display device according to claim 14, further comprising
a control device for controlling the output of the light source, wherein the light source includes point-like light emitters arranged so as to face the light entrance surface of the light guide plate; and
the control device is configured to adjust the output of each point-like light emitter according to an image to be displayed.

16. A light guide plate having a light exit surface, a back surface opposed to the light exit surface, at least one light entrance surface consisting of a part of the side surface between the light exit surface and the back surface, and a counter surface consisting of a part of the side surface and opposing the one light entrance surface in a first direction, said light guide plate comprising:
a body portion;
first unit optical elements arranged on a one-side surface of the body portion in an arrangement direction intersecting the first direction, each element extending in a direction intersecting the arrangement direction; and
second unit optical elements disposed between first unit optical elements on the one-side surface of the body portion;
wherein a width of each first unit optical element in the arrangement direction increases with distance from a light entrance surface-side end in at least one section of the area from the light entrance surface-side end on the one-side surface of the body portion to a center between the light entrance surface and the counter surface on the one-side surface of the body portion;
wherein when the light exit surface is viewed in the normal direction of the one-side surface of the body portion, a proportion of an area occupied by the second unit optical elements in the light exit surface is smaller in the central area than in the end area;
wherein a light exit surface angle of each first unit optical element, which is the angle of a light exit-side surface of the first unit optical element with respect to the one-side surface of the body portion in a main cross-section parallel to both the normal direction of the one-side surface of the body portion and the arrangement direction of the first unit optical elements, changes in at least one portion or region between an apex, the farthest point from the one-side surface of the body portion, and each base end, the closest portion to the one-side surface of the body portion, in the light exit-side surface of the first unit optical element such that the light exit surface angle solely increases from that at the apex to that at the base end; and
wherein in a cross-sectional shape of each first unit optical element in a main cross-section parallel to both the normal direction of the one-side surface of the body portion and the arrangement direction of the first unit optical elements, and containing the center on the one-side surface of the body portion, a shape of a part of each first unit optical element containing an apex, the farthest point from the one-side surface of the body portion, is identical to the cross-sectional shape of a whole of each second unit optical element in the main cross-section parallel to both the normal direction of the one-side surface of the body portion and the arrangement direction of the first unit optical elements.

17. The light guide plate according to claim 16, wherein said at least one section starts at the light entrance surface-side end on the one-side surface.

18. The light guide plate according to claim 16, wherein a ratio of a height of each first unit optical element to the width of the first unit optical element in the arrangement direction, at the center on the one-side surface of the body portion, is higher than a ratio of a height of each second unit optical element to a width of the second unit optical element in the arrangement direction at the light entrance surface-side end on the one-side surface of the body portion.

19. The light guide plate according to claim 16, wherein an angle of a light exit-side surface of each first unit optical element with respect to the one-side surface of the body portion at a base end of a light exit-side surface, the closest portion to the one-side surface of the body portion, in a cross-section parallel to both a normal direction of the one-side surface of the body portion and the arrangement direction of the first unit optical elements, and containing the center on the one-side surface of the body portion, is larger than an angle of a light exit-side surface of each second unit optical element with respect to the one-side surface of the body portion at a base end of the light exit-side surface, the closest portion to the one-side surface of the body portion, in a cross-section or end surface parallel to both the normal direction of the one-side surface of the body portion and the arrangement direction of the first unit optical elements, and containing the light entrance surface-side end on the one-side surface of the body portion.

* * * * *